United States Patent
Ijiro et al.

(10) Patent No.: US 9,916,445 B2
(45) Date of Patent: Mar. 13, 2018

(54) ATTACK DETECTION DEVICE, ATTACK DETECTION METHOD, AND NON-TRANSITORY COMPUTER READABLE RECORDING MEDIUM RECORDED WITH ATTACK DETECTION PROGRAM

(71) Applicant: MITSUBISHI ELECTRIC CORPORATION, Tokyo (JP)

(72) Inventors: Hideaki Ijiro, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/121,716

(22) PCT Filed: Feb. 26, 2014

(86) PCT No.: PCT/JP2014/001000
§ 371 (c)(1),
(2) Date: Aug. 25, 2016

(87) PCT Pub. No.: WO2015/128896
PCT Pub. Date: Sep. 3, 2015

(65) Prior Publication Data
US 2016/0378980 A1 Dec. 29, 2016

(51) Int. Cl.
*G06F 21/55* (2013.01)
*H04L 29/06* (2006.01)

(52) U.S. Cl.
CPC ............ *G06F 21/554* (2013.01); *G06F 21/55* (2013.01); *H04L 63/1416* (2013.01)

(58) Field of Classification Search
CPC ..... G06F 21/554; G06F 21/55; H04L 63/1416
See application file for complete search history.

(56) References Cited

U.S. PATENT DOCUMENTS 7,032,114 B1 * 4/2006 Moran ................ G06F 21/554
713/176
7,203,962 B1 * 4/2007 Moran ................ G06F 21/52
726/23

(Continued)

FOREIGN PATENT DOCUMENTS

CA 2 453 127 A1 4/2004
EP 1 405 187 4/2004
(Continued)

OTHER PUBLICATIONS

Carvalho, Marco et al., "Automatic Discovery of Attack Messages and Pre- and Post-Conditions for Attack Graph Generation", Conference Paper • Jan. 2010, pp. 1-12.*

(Continued)

*Primary Examiner* — Michael Pyzocha
(74) *Attorney, Agent, or Firm* — Birch, Stewart, Kolasch & Birch, LLP

(57) ABSTRACT

For a plurality of events, event stage information is stored which describes an event observed by an information system when an attack against the information system is underway, a pre-event stage, and a post-event stage. Observed event notice information is received which notifies an observed event observed by the information system. Event stage information is searched for which describes the observed event notified by the observed event notice information. Event stage information is searched for which describes a post-event stage coinciding with a pre-event stage of the event stage information searched for, or a pre-event stage coinciding with a post-event stage of the event stage information searched for. If an event of the event stage information searched for is an observation non-available event that cannot be observed, an event sequence is created by treating the observation non-available event as having been observed (Continued)

and connecting the observed event and the observation non-available event to each other with a dependency.

8 Claims, 27 Drawing Sheets

(56) References Cited

U.S. PATENT DOCUMENTS

| | | | |
|---|---|---|---|
| 8,904,531 B1* | 12/2014 | Saklikar | H04L 63/1416 707/695 |
| 2004/0093510 A1 | 5/2004 | Nurmela | |
| 2004/0250158 A1* | 12/2004 | Le Pennec | H04L 41/28 714/4.1 |
| 2005/0091513 A1 | 4/2005 | Mitomo et al. | |
| 2005/0151671 A1* | 7/2005 | Bortolotto | G08G 1/054 340/936 |
| 2006/0190592 A1 | 8/2006 | Fujita et al. | |
| 2008/0281962 A1* | 11/2008 | Kai | G06Q 10/06 709/224 |
| 2010/0287615 A1 | 11/2010 | Martin et al. | |
| 2010/0325493 A1 | 12/2010 | Morimura et al. | |
| 2011/0145185 A1* | 6/2011 | Wang | H04L 41/147 706/52 |
| 2011/0270957 A1* | 11/2011 | Phan | H04L 41/0622 709/221 |
| 2011/0302305 A1 | 12/2011 | Morimura et al. | |
| 2012/0159519 A1 | 6/2012 | Matsuda | |
| 2013/0182107 A1* | 7/2013 | Anderson | G08B 21/02 348/143 |
| 2013/0325787 A1* | 12/2013 | Gerken | G06N 7/005 706/52 |
| 2014/0040916 A1* | 2/2014 | Balakrishnan | G06F 9/542 719/313 |
| 2014/0201133 A1* | 7/2014 | Kawabata | G06F 17/30958 707/609 |
| 2015/0256554 A1* | 9/2015 | Sakakibara | G06F 11/34 726/25 |
| 2016/0164893 A1* | 6/2016 | Levi | H04L 63/1416 726/23 |

FOREIGN PATENT DOCUMENTS

| | | |
|---|---|---|
| JP | 2004-535018 A | 11/2004 |
| JP | 2005-136526 A | 5/2005 |
| JP | 2005-151289 A | 6/2005 |
| JP | 2005-196675 A | 7/2005 |
| JP | 2005-198031 A | 7/2005 |
| JP | 2005-244429 A | 9/2005 |
| JP | 2006-65835 A | 3/2006 |
| JP | 2006-211609 A | 8/2006 |
| JP | 2007-242002 A | 9/2007 |
| JP | 2008-167099 A | 7/2008 |
| JP | 2010-237975 A | 4/2010 |
| JP | 2010-250607 A | 11/2010 |
| JP | 2010-539574 A | 12/2010 |
| JP | 2012-128811 A | 7/2012 |
| WO | WO 03/005200 A1 | 1/2003 |
| WO | WO 2009/037333 A2 | 3/2009 |
| WO | WO 2010/237975 A | 4/2010 |
| WO | 2013/114830 A1 | 8/2013 |

OTHER PUBLICATIONS

Kiyoto Kawauchi et al., "A Vulnerability Assessment Tool Using First-Order Predicate Logic", Dec. 20, 2002, pp. 43-48.

Peng Ning et al., "Constructing Attack Scenarios through Correlation of Intrusion Alerts", CCS'02, Nov. 18-22, 2002, Washington, DC, USA.

Plan Recognition in Intrusion Detection Systems, Honeywell Labs, 2001 IEEE, pp. 46-55.

* cited by examiner

Fig. 4

| EVENT NAME | TIME OF OCCURRENCE | SOURCE | TRANSMISSION DESTINATION | PRECONDITION | ACHIEVED STATE | OBSERVATION AVAILABILITY |
|---|---|---|---|---|---|---|
| PORT SCANNING | - | - | - | - | VULNERABLE SERVICE DISCOVERED | YES |
| PASSWORD LEAK | - | - | - | VULNERABLE SERVICE DISCOVERED | PASSWORD ACQUIRED | NO |
| ENTER INTO SERVER | - | - | - | PASSWORD ACQUIRED | SERVER CONFIGURATION INFORMATION VIEWABLE | YES |
| .. | .. | .. | .. | .. | .. | .. |

Fig.17

| EVENT NAME | OCCURRENCE DETERMINATION |  |
|---|---|---|
| PASSWORD LEAK | YES |  |
| .. | .. |  |

ATTACK DETECTION DEVICE, ATTACK DETECTION METHOD, AND NON-TRANSITORY COMPUTER READABLE RECORDING MEDIUM RECORDED WITH ATTACK DETECTION PROGRAM

TECHNICAL FIELD

The present invention relates to an attack detection device which detects, via a network, an attack being carried out in a plurality of stages divisionally.

BACKGROUND ART

A multi-stage attack refers to an attack carried out by an attacker in a plurality of stages divisionally to attain one purpose. Conventionally, in order to detect this attack, a scheme is available (for example, Non-Patent Literature 1) in which for an individual event such as an IDS (Intrusion Detection System) alert, a necessary condition (called an event precondition in this case) for the event to be effected and a state change (called an event result in this case) caused by the event are defined, and whether an attack is underway or not is determined in accordance with whether an event sequence, being a connection of events where a result of an event serves as the precondition of another event, can be created.

More specifically, according to the scheme of Non-Patent Literature 1, the dependency between events detected in advance is defined. For example, the dependency is defined like "an actual attack event comes after a port scanning event". In the definition of this dependency, a precondition and result (prerequisite and consequence respectively in the literature) are further defined for each of events. If a result satisfying the precondition of a certain event B is provided by another event A, B is treated as depending on A. By utilizing such dependencies of the individual events, the relations among the observed events are expressed in the form of a graph according to their dependencies, so that whether or not a multi-stage attack is underway can be determined.

A scheme has already been proposed (for example, Patent Literature 1) which determines the event dependencies even when there is an event that has passed through detection. According to this scheme, the relation among event management targets is prescribed in advance, and the event dependency of each management target is determined. More specifically, assume that there are the first, second, and third management targets. In the second management target, the second event occurs depending on the first event occurring in the first management target. In the third management target, the third event occurs depending on the second event occurring in the second management target. The difference between the time of occurrence of the first event and the time of occurrence of the third event is obtained. If the time difference falls within a predetermined time frame, it can be determined that there is a dependency between the first and third events even when the second event has passed through detection.

CITATION LIST

Patent Literature

Patent Literature 1: JP 2012-128811 A

Non-Patent Literature

Non-Patent Literature 1: Peng Ning, Yun Cui, Douglas S. Reeves, "Constructing Attack Scenarios through Correlation of Intrusion Alerts", CCS '02, Nov. 18-22, 2002, Washington, D.C., USA.

SUMMARY OF INVENTION

Technical Problem

Events may include an event the system is unable to observe because, for example, the event is not described in the log or is not treated as a monitoring target due to the cost, and an event the system was unable to observe because the event had passed through detection. In such cases, a problem arises with the scheme of Non-Patent Literature 1 that an attack that should be detectable as an event sequence if the attack is observable is not actually treated as an event sequence, leading to delayed multi-stage detection.

The scheme of Patent Literature 1 has a problem that where an event may pass through detection, although the dependencies among observed events can be determined, the dependency of an observed event with a non-observed event (the second event described above) cannot be estimated.

The scheme of Patent Literature 1 discloses that where an event may pass through detection, the dependencies among the monitoring targets of each event are held by a process assignment table in order to determine the dependencies. Hence, the dependencies among the management targets of all events need be held, resulting in a problem that as the number of events to be managed increases, the dependencies among the management targets of the events increases explosively.

The present invention has been made to solve the above problems, and has as its objective to determine the dependencies among events including a non-observed event, by estimating an event unable to observe and by generating an event sequence.

It is also an objective of the present invention to dynamically check an event having a dependency with an occurring event, by defining a precondition and result to each event, and to estimate an event the system is unable to detect without holding the dependencies among the management targets of all the events, thereby preventing the dependencies among the management targets of the events from increasing explosively as the number of events to be managed increases.

Solution to Problem

In order to solve the problems described above, an attack detection device according to the present invention includes: an event stage information storage unit which stores, for a plurality of events, event stage information describing an event, a pre-event stage, and a post-event stage, the event being observed by an information system when an attack against the information system is underway, the pre-event stage being a stage of a progress of an attack which is made before the event is observed, the post-event stage being a stage of a progress of an attack which is made after the event is observed; an observed event notice information reception unit which receives observed event notice information notifying an observed event observed by the information system; and an event sequence creation unit which searches for event stage information describing the observed event notified by the observed event notice information, from the event stage information storage unit, searches for event stage information describing a post-event stage coinciding with a pre-event stage of the event stage information searched for or a pre-event stage coinciding with a post-event stage of the event stage information searched for, from the event stage information storage unit, and if an event of the event stage information searched for is an observation non-available event that cannot be observed, creates an event sequence by treating the observation non-available event as having been observed and connecting the observed event and the observation non-available event to each other with a dependency.

Advantageous Effects of Invention

According to the present invention, a parameter is defined for each event to represent whether or not the event can be observed by a system. If the system is unable to observe an event, it is presumed that a matching event has been observed. The dependency with the matching event is estimated dynamically, and an event sequence is created. Hence, even when an event the system is unable to observe is included, an event sequence can be created, providing the effect of preventing detection pass-through of a multi-stage attack.

BRIEF DESCRIPTION OF DRAWINGS

FIG. 4 illustrates an example of attack event definition information 9 stored in an event database 5.

FIG. 17 is a diagram illustrating a storing example of a determination result table 33 according to Embodiment 5.

DESCRIPTION OF EMBODIMENTS

Embodiment 1

Figure 1:
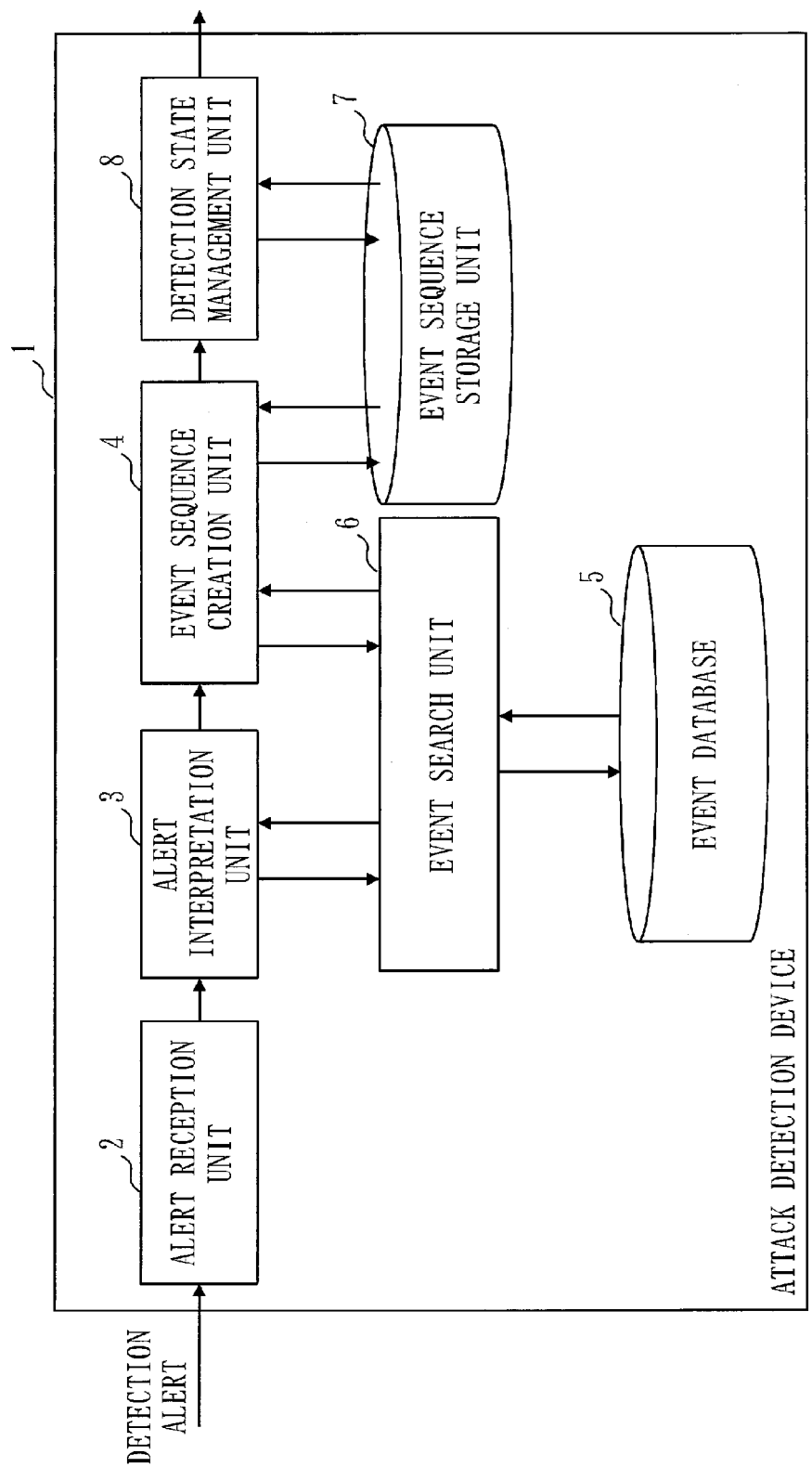
FIG. 1 is a configuration diagram illustrating a configuration example of an attack detection device according to Embodiment 1.

FIG. 1 is a configuration diagram illustrating a configuration example of an attack detection device according to Embodiment 1.

Referring to FIG. 1, an attack detection device 1 is constituted of an alert reception unit 2, an alert interpretation unit 3, an event sequence creation unit 4, an event database 5, an event search unit 6, an event sequence storage unit 7, and a detection state management unit 8.

Based on a detection alert obtained from the outside, the attack detection device 1 checks a dependency with an already observed attack event and creates an event sequence, thereby detecting a multi-stage attack.

The alert reception unit 2 receives the alert detected from the outside and outputs the alert to the alert interpretation unit 3. The alert interpretation unit 3 extracts information corresponding to attack event definition information (to be described later) which is defined in advance, from the alert received by the alert reception unit 2. The alert interpretation unit 3 interprets the received alert as representing an attack event and creates observed event notice information (to be described later). The alert interpretation unit 3 outputs the observed event notice information (attack event of the interpretation result) to the event sequence creation unit 4. The alert reception unit 2 and alert interpretation unit 3 are a configuration example of an observed event notice information reception unit.

The event sequence creation unit 4 adds the attack event inputted from the alert interpretation unit 3 to an event sequence of observed attack events, thereby creating a new event sequence. The event sequence creation unit 4 also registers the created new event sequence with the event sequence storage unit 7 and updates an existing event sequence held in the event sequence creation unit 4 to a new event sequence.

The event database 5 stores the attack event definition information (to be described later) defined in advance. The event database 5 is an example of an event stage information storage unit. The attack event definition information is an example of event stage information.

The event search unit 6 searches the event database 5 in response to search requests from the alert interpretation unit 3 and event sequence creation unit 4, and outputs the search result to the alert interpretation unit 3 and event sequence creation unit 4.

The event sequence storage unit 7 stores the event sequence created by the event sequence creation unit 4.

The detection state management unit 8 receives a completion notice of a registration/update process from the event sequence storage unit 7 which is conducted by the event sequence creation unit 4, and checks whether or not a multi-stage attack is underway from the state of the event sequence storage unit 7. If a multi-stage attack is underway, the detection state management unit 8 notifies this to the outside.

The operation of the attack detection device according to Embodiment 1 will be described with referring to FIG. 2.

Figure 2:
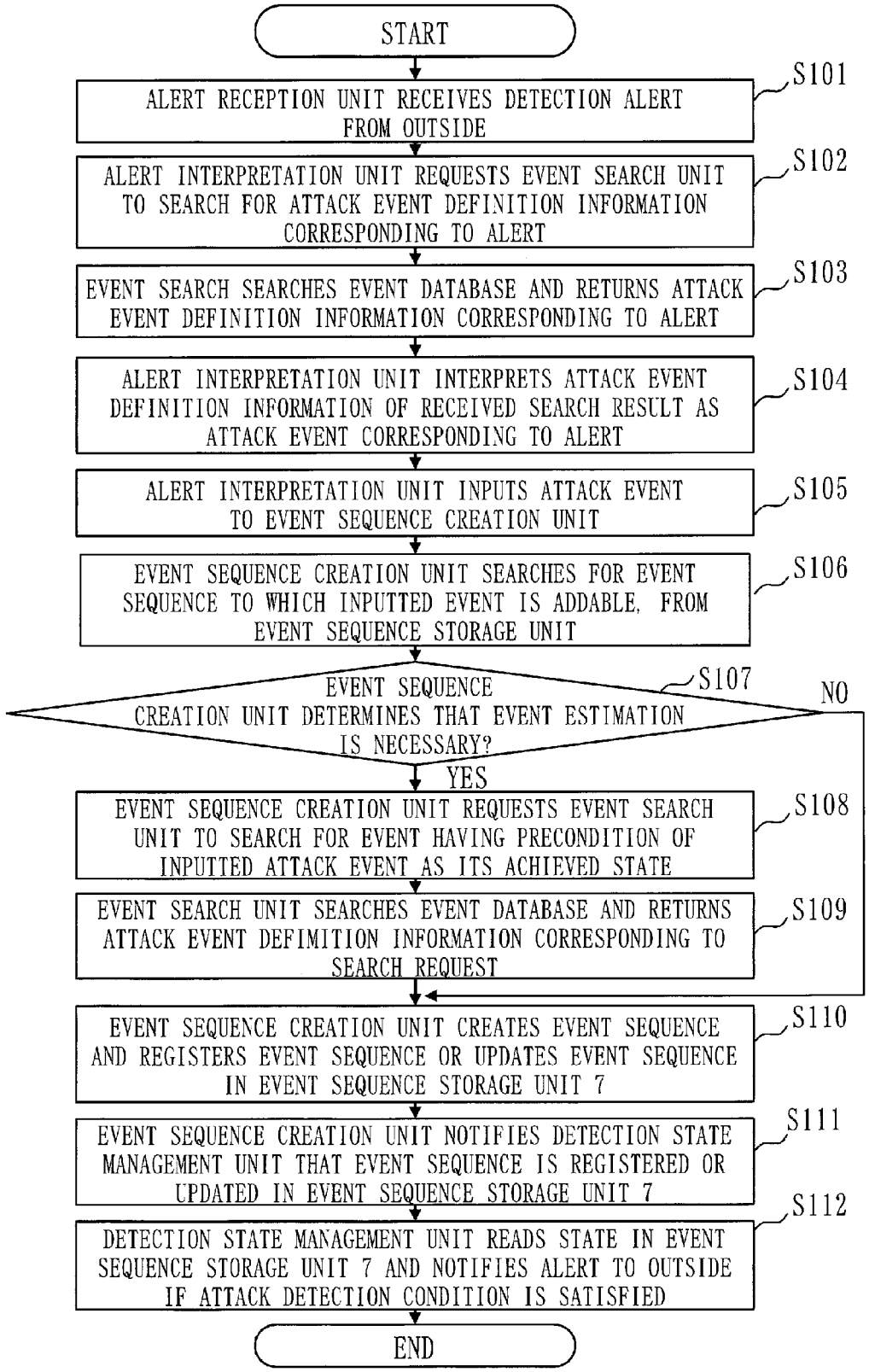
FIG. 2 is a flowchart illustrating a flow of an overall process of an attack detection device according to Embodiment 1.

FIG. 2 is a flowchart illustrating a flow of a process of the attack detection device according to Embodiment 1.

First, in step S101, the alert reception unit 2 receives a detection alert from the outside. The detection alert is an alarm message transmitted from each of the individual types of instruments connected to the network and is, for example, an IDS alert. The detection alert includes information such as the IP address and port number of a transmission destination, the IP address and port number of a transmission source, a protocol such as TCP or UDP, and information on a detected attack event (log-in, port scanning, or the like). Upon reception of the detection alert, the alert reception unit 2 inputs alert information to the alert interpretation unit 3.

Subsequently, in step S102, the alert interpretation unit 3 requests the event search unit 6 to search for the attack event definition information corresponding to the alert. The alert interpretation unit 3 creates a search request including the attack event name included in the inputted alert information and transmits the search request to the event search unit 6.

Then, in step S103, the event search unit 6 searches the event database 5 and returns the attack event definition information corresponding to the alert. The event search unit 6 searches for attack event definition information coinciding with the attack event included in the search request, from among the attack event definition information stored in the event database 5, and returns the search result to the alert interpretation unit 3.

In the attack event definition information, information concerning the attack event is defined in advance.

The attack event definition information is information in which information concerning the attack event is defined in advance.

Figure 3:
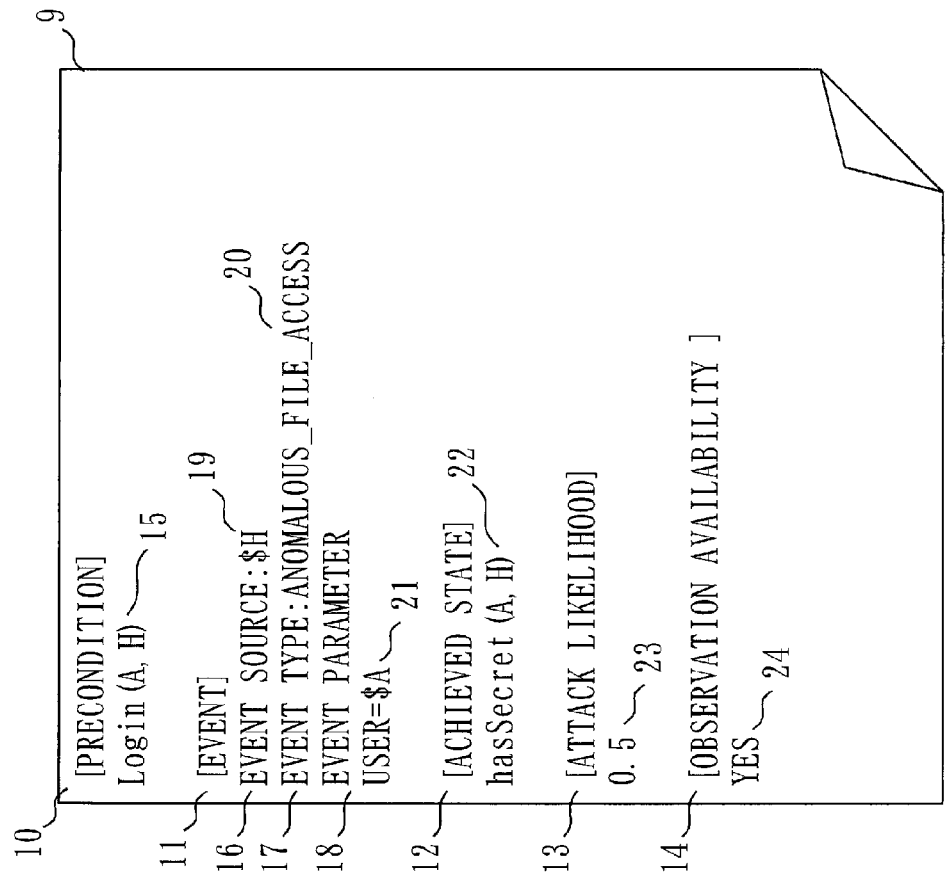
FIG. 3 is a diagram illustrating an example of attack event definition information.

FIG. 3 is a diagram illustrating an example of the attack event definition information.

As indicated by attack event definition information 9 of FIG. 3, the attack event definition information is constituted of a precondition 10, an event 11, an achieved state 12, an attack likelihood 13, and observation availability 14.

The precondition 10 describes, in the form of predicate logic, a prerequisite condition for the event 11 to occur at the time of an attack. More specifically, the precondition 10 describes a stage (pre-event stage) of a progress of an attack before the event 11 is observed. For example, predicate logic presented by reference numeral 15 in FIG. 3 expresses a stage "A logs in to H" as a precondition. A and H presented by reference numeral 15 are variables that are bound to specific values (such as "user001") by a value obtained from the observed event, for example.

The event 11 is an event observed by the information system when an attack against the information system is underway. In relation to the event 11, an event source 16, an event type 17, and an event parameter 18 are defined.

The event source 16 indicates an event source as an object of the attack activity definition information 9. Reference numeral 19 represents a value allowed as the source and, in this example, is associated with the precondition 15 by a variable H ($ at the beginning of $H indicates that H is a variable).

The event type 17 designates the type of the event as an object of the attack event definition information 9. The specific event type is designated like reference numeral 20.

The event parameter 18 expresses the parameter of the event. The event parameter 18 designates a value as an object of the attack event definition information 9. In the example illustrated in FIG. 3, a parameter named USER is required to have the same value as that of the variable A indicated by reference numeral 15.

With the observed event notice information, the event source, the event type, and the event parameter are notified, as with the attack event definition information 9 of FIG. 3. In the attack event definition information 9 of FIG. 3, the values of the variables of the event source 16 and the event parameter 18 are not specified. In the observed event notice information, the values of the variables of the event source 16 and event parameter 18 are specified.

The achieved state 12 indicates, by predicate logic, a state that the attacker achieved at the time an event coinciding with the items of reference numerals 16 to 18 of the attack event definition information 9 has occurred. Namely, the achieved state 12 describes a stage (post-event stage) of a progress of an attack after the event coinciding with the items of reference numerals 16 to 18 is observed. In the example of FIG. 3, reference numeral 22 indicates a stage where "a user A has obtained the secret of a host H".

The attack likelihood 13 indicates the likelihood of the attack against the information system when an event coinciding with the items of reference numerals 16 to 18 of the attack event definition information 9 occurs. In the example of FIG. 3, the likelihood value is defined to be 0.5, as indicated by reference numeral 23.

The observation availability 14 indicates whether or not the event 11 is an event the system is unable to observe. For example, an event the system is unable to observe is an event not described in the log, like password leak, and an event not treated as an observation target due to the cost and monitoring load. In the example of FIG. 3, reference numeral 24 indicates that "Yes" is set representing that observation is available. If observation is not available, "No" is set.

The attack event definition information 9 described above is defined in advance for a plurality of events which are supposed to occur in a multi-stage attack, and is stored in the event database 5 in a searchable state.

FIG. 4 illustrates an example of the attack event definition information 9 stored in an event database 5.

The storing example of FIG. 4 includes, in addition to the information defined in the attack event definition information 9, information such as the time of occurrence, source, and transmission destination which are recorded when the attack event is detected. The source is, for example, transmission source IP address. As the transmission destination, transmission destination URL is recorded. The storing example of FIG. 4 indicates a state before the attack event is detected, in which the fields of the time of occurrence, source, and transmission destination are vacant.

In step S104, the alert interpretation unit 3 interprets the attack event definition information of the received search result as an attack event corresponding to an alert. An "interpreting" process refers to a process of assigning the actual values of the event source, event type, and event parameter included in the alert to the attack event definition information being the search result obtained by the event search unit 6, so that the observed event has such a data format that it can be processed as an attack event (observed event notice information).

Then, in step S105, the alert interpretation unit 3 inputs an event to the event sequence creation unit 4. The alert interpretation unit 3 inputs the attack event as interpreted from the observed event in step S104 to the event sequence creation unit 4.

In step S106, the event sequence creation unit 4 searches for an event sequence to which the inputted attack event can be added, from the event sequence storage unit 7.

Then, in step S107, the event sequence creation unit 4 checks whether or not event estimation is necessary. As the result of search in step S106, if an addable event sequence does not exist in the event sequence storage unit 7, the event sequence creation unit 4 moves to Yes branch, and performs event estimation in step S108. A process concerning the event estimation will be described later in detail. If an addable event sequence exists in the event sequence storage unit 7, the event sequence creation unit 4 determines that event estimation is unnecessary and moves to No branch.

In step S108, the event sequence creation unit 4 requests the event search unit 6 to search for an event having the precondition of the inputted attack event as its achieved state, and executes the process of event estimation.

In step S109, the event search unit 6 searches the event database 5 and returns attack event definition information corresponding to the search request.

In step S110, the event sequence creation unit 4 creates an event sequence utilizing the attack event definition information searched for in step S109, and registers the created event sequence to the event sequence storage unit 7 or updates the event sequence in the event sequence storage unit 7.

In step S111, the event sequence creation unit 4 notifies the detection state management unit 8 that the event sequence is registered or updated in the event sequence storage unit 7.

Finally, in step S112, the detection state management unit 8 reads the state in the event sequence storage unit 7. If an attack detection condition is satisfied, the detection state management unit 8 notifies an alert to the outside. Upon reception of the notice from the event sequence creation unit 4, the detection state management unit 8 checks the event sequence existing in the event sequence storage unit 7. If the total value of the attack likelihoods of the individual attack events constituting the event sequence is equal to or larger than a threshold value, the detection state management unit 8 determines that a multi-stage attack is underway, and notifies this to the outside.

The flow of the overall process of the attack detection device according to Embodiment 1 has been described so far.

The configuration and operation of the event sequence creation unit 4 according to Embodiment 1 will be described in detail.

First, the configuration of the event sequence creation unit 4 will be described.

Figure 5:
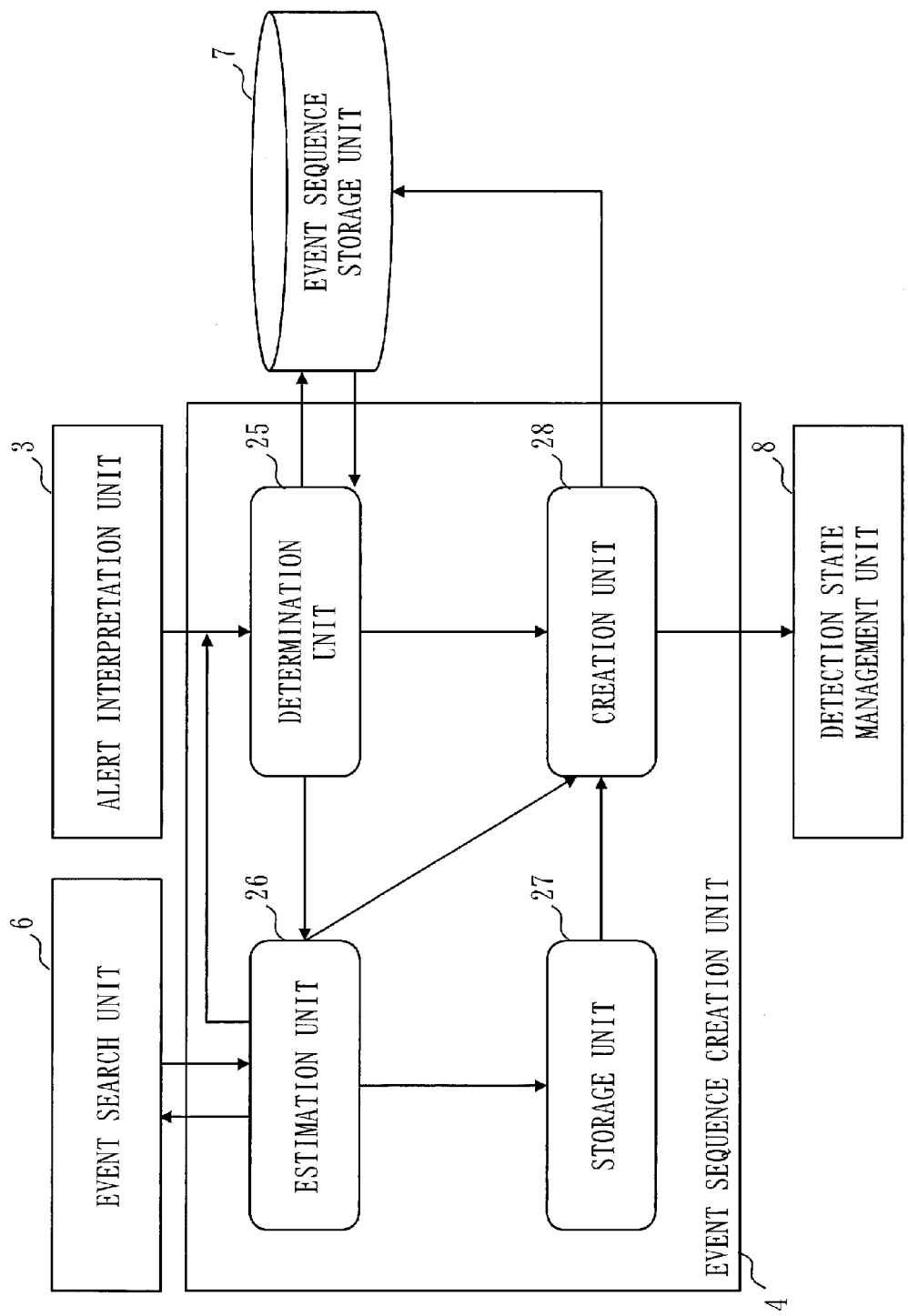
FIG. 5 is a configuration diagram illustrating a configuration example of an event sequence creation unit 4 according to Embodiment 1.

FIG. 5 is a configuration diagram illustrating a configuration example of the event sequence creation unit 4 according to Embodiment 1.

A determination unit 25 verifies whether or not the attack event inputted from the alert interpretation unit 3 can be added to the event sequence registered in the event sequence storage unit 7. If the inputted attack event cannot be added to the event sequence, the determination unit 25 determines that estimation of a non-observed event is necessary. If the inputted attack event can be added to the event sequence, the determination unit 25 determines that estimation of a non-observed event is not necessary. If it is determined that estimation of a non-observed event is necessary, an estimation unit 26 estimates a non-observed event. If estimation is not necessary, the inputted attack event is inputted to a creation unit 28, and an event sequence is created.

The estimation unit 26 requests the event search unit 6 to search for an attack event having a dependency with the inputted attack event, and receives a search result of the event search unit 6. If the attack event being the search result is an attack event the system cannot observe, the estimation unit 26 determines that an attack event newly obtained by the search is observed. At this time, the attack event inputted to the estimation unit 26 is stored in a storage unit 27. The attack event treated as having been observed is inputted to the determination unit 25 and undergoes verification as to whether or not it can be added to the event sequence. If the determination unit 25 determines that estimation is necessary, then the attack event is inputted to the estimation unit 26, and estimation of an attack event is carried out. If the determination unit 25 determines that estimation is not necessary, the inputted attack event is inputted to the creation unit 28, and an event sequence is created.

With respect to the attack event inputted from the determination unit 25 or estimation unit 26, the creation unit 28 calls an attack event that depends on the inputted attack event, from the storage unit 27. After that, the creation unit 28 adds the inputted attack event to the called attack event, thereby creating a new event sequence. The newly created event sequence is registered to the event sequence storage unit 7. If the newly created event sequence includes an event that can be added to the existing event sequence, the newly created event sequence is connected to the existing event sequence, and the event sequence storage unit 7 is updated. The creation unit 28 notifies the detection state management unit 8 that the event sequence storage unit 7 is updated by creating an event sequence.

The operation of the event sequence creation unit 4 will be described in detail.

Figure 6:
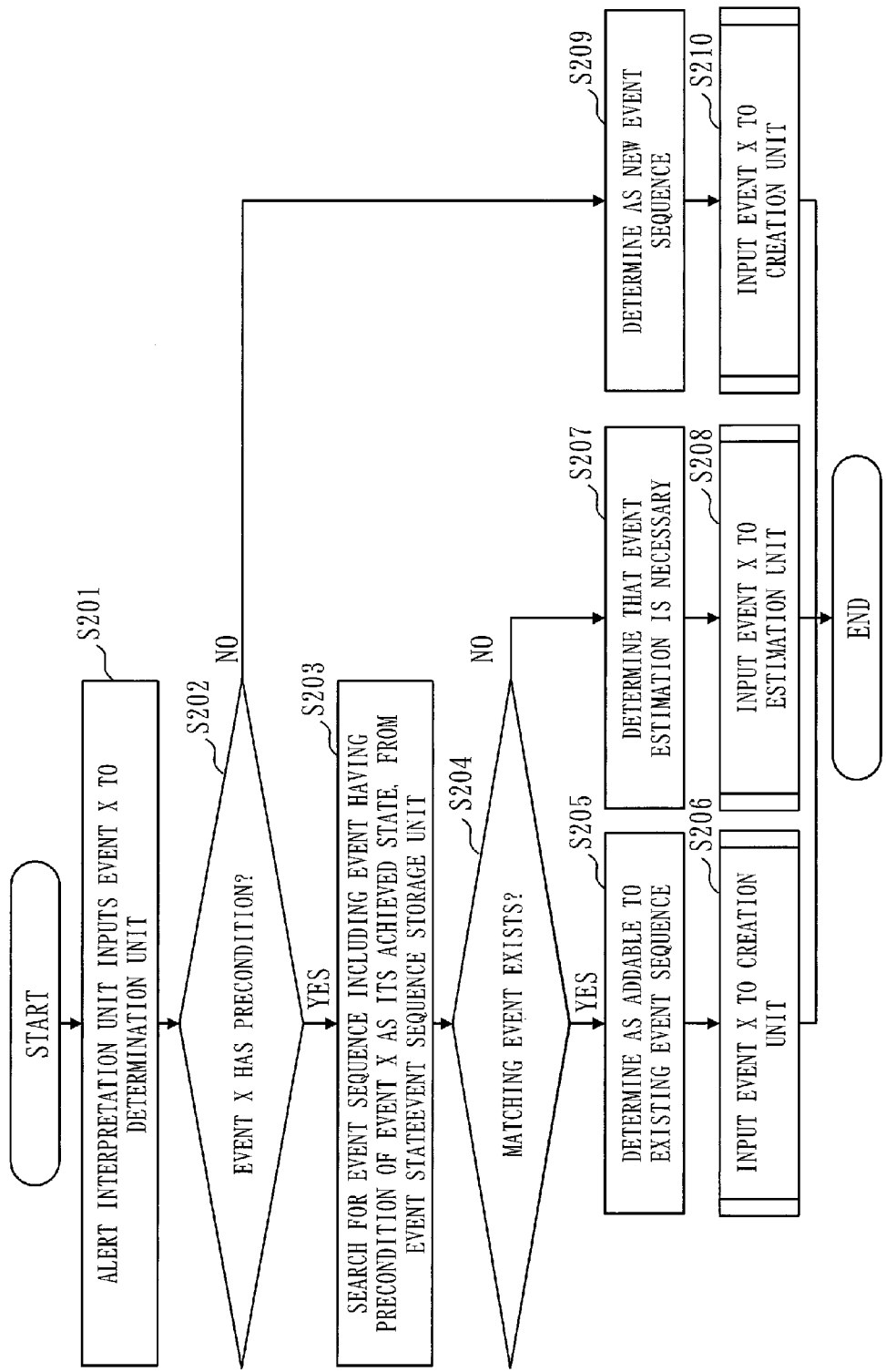
FIG. 6 is a flowchart illustrating a flow of a process of a determination unit 25 according to Embodiment 1.

FIG. 6 is a flowchart illustrating a flow of a process of the determination unit 25 according to Embodiment 1.

First, in step S201, the alert interpretation unit 3 inputs an event X to the determination unit 25. The event X is an attack event (observed event notice information) of step S105 in FIG. 2.

Then, in step S202, the determination unit 25 checks whether or not the event X has a precondition. If the event X has a precondition, the determination unit 25 moves to step S203 via Yes branch. If the event X does not have a precondition, the determination unit 25 moves to step S209 via No branch.

In step S203, the determination unit 25 requests the event search unit 6 to search for an event sequence that includes an event having the precondition of the event X as its achieved state. This event sequence is searched for from the event sequence storage unit 7.

In step S204, the determination unit 25 checks whether or not an event sequence that matches the search request exists. If an event sequence that matches the search request exists, the determination unit 25 moves to step S205 via Yes branch. If an event sequence that matches the search request does not exist, the determination unit 25 moves to step S207 via No branch.

In step S205, the determination unit 25 determines that the event X is addable to the existing event sequence. In step S206, the event X is inputted to the creation unit 28 in step S206. Then, the processing ends.

In step S204, if an event sequence that matches the search request does not exist, then in step S207, the determination unit 25 determines that estimation of an event is necessary. In step S208, the event X is inputted to the estimation unit 26. Then, the processing ends.

In step S202, if the event X is an event not having a precondition, then in step S209, the determination unit 25 determines that the event X is a new event sequence. In step S210, the inputted event X is inputted to the creation unit 28. Then, the processing ends.

As described above, the event X inputted to the determination unit 25 is then inputted to either the estimation unit 26 or creation unit 28 depending on the processing in the determination unit 25.

The operation of a case where the event X is inputted to the estimation unit 26 will be described.

Figure 7:
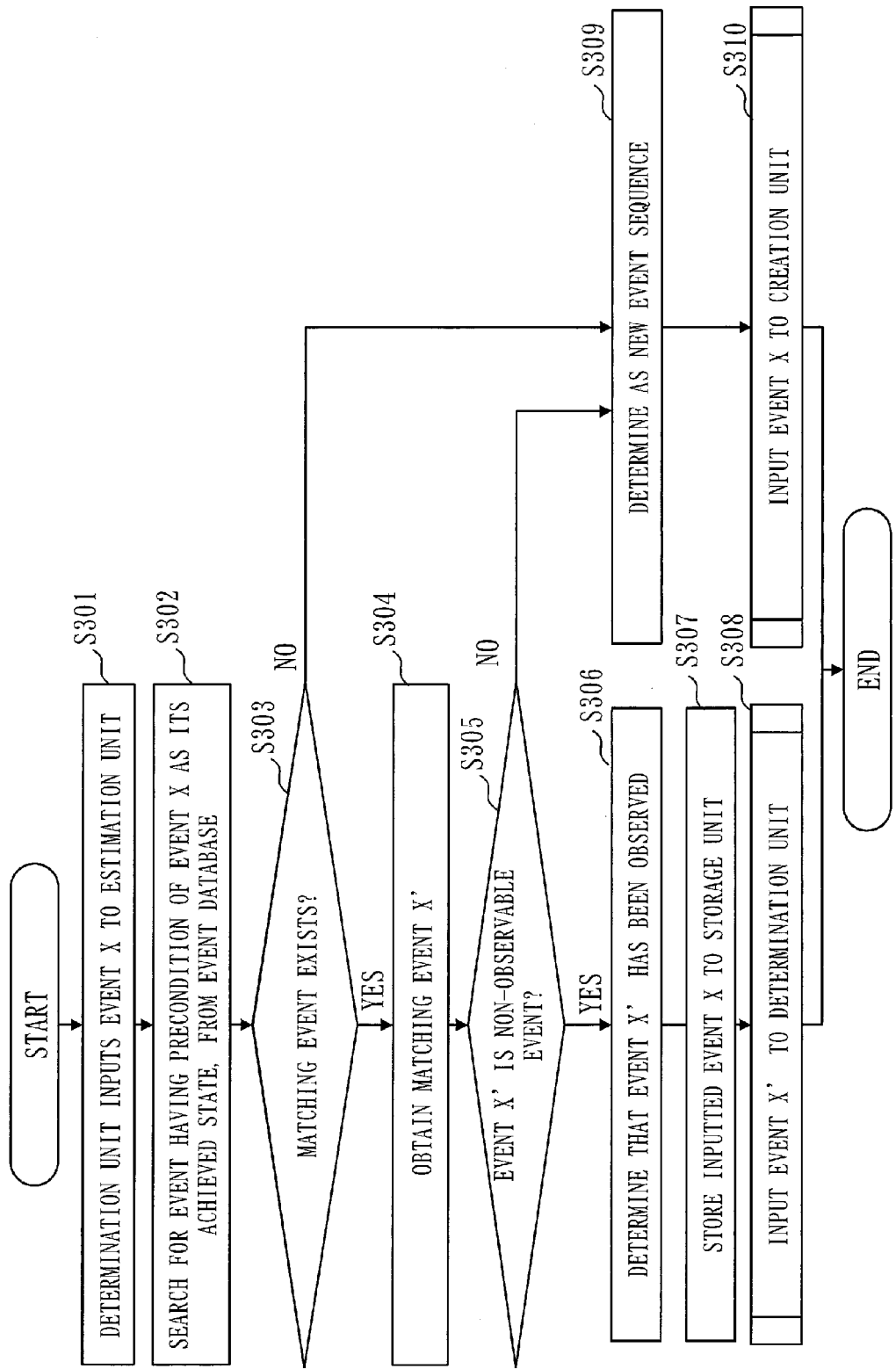
FIG. 7 is a flowchart illustrating a flow of a process of an estimation unit 26 according to Embodiment 1.

FIG. 7 is a flowchart illustrating a flow of a process of the estimation unit 26 according to Embodiment 1.

First, in step S301, the determination unit 25 inputs the event X to the estimation unit 26.

Then, in step S302, the estimation unit 26 requests the event search unit 6 to search for an event having the precondition of the event X as its achieved state. This event is searched for from the event database 5.

In step S303, the estimation unit 26 checks whether or not an event that matches the search request exists. If an event that matches the search request exists (in this case, it is assumed that two or more matching events do not exist), the estimation unit 26 moves to step S304 via Yes branch. If an event that matches the search request does not exist, the estimation unit 26 moves to step S309 via No branch.

In step S304, the estimation unit 26 obtains an event X' that matches the search request, from the event search unit 6.

In step S305, the estimation unit 26 checks whether or not the event X' is a non-observable event, from the setting of the observation availability. If the event X' is a non-observable event, the estimation unit 26 moves to step S306 via Yes branch. If the event X' is an observable event, the estimation unit 26 moves to step S309 via No branch.

Then, in step S306, the estimation unit 26 determines that the event X' has already been observed. In step S307, the estimation unit 26 stores the inputted event X to the storage unit 27. In step S308, the estimation unit 26 inputs the event X' to the determination unit. Then, the processing ends.

If the event X' is an observable event in step S305, or if an event that matches the search request does not exist in step S303, then in step S309, the estimation unit 26 determines that the inputted event X is a new event sequence. In step S310, the estimation unit 26 inputs the event X to the determination unit 25. Then, the processing ends.

The operation of a case will be described where the event X is inputted to the creation unit 28 by the process in the determination unit 25 or estimation unit 26.

Figure 8:
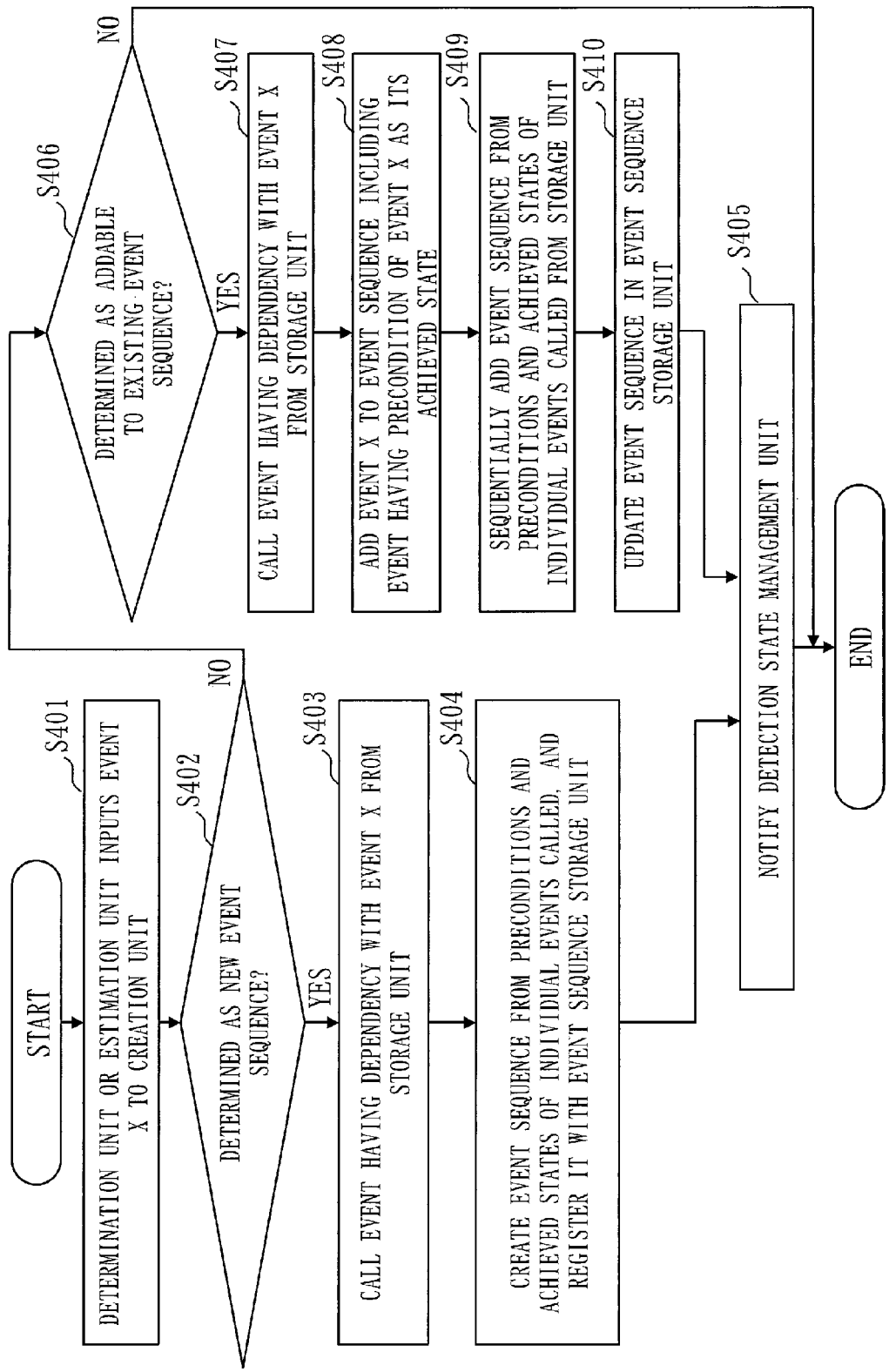
FIG. 8 is a flowchart illustrating a flow of a process of a creation unit 28 according to Embodiment 1.

FIG. 8 is a flowchart illustrating a flow of a process of the creation unit 28 according to Embodiment 1.

First, in step S401, the determination unit 25 or estimation unit 26 inputs the event X to the creation unit 28.

Then, in step S402, the creation unit 28 checks whether or not the inputted event X is determined as a new event sequence by the determination unit 25 or estimation unit 26. If the inputted event X is determined as a new sequence, the creation unit 28 moves to step S403 via Yes branch. If the inputted event X is not determined as a new sequence, the creation unit 28 moves to step S406 via No branch.

In step S403, the creation unit 28 calls an event having a dependency with the event X, from the storage unit 27. At this time, the dependency is determined in accordance with the relations between the preconditions and achieved states of the events stored in the storage unit 27.

Then, in step S404, the creation unit 28 creates an event sequence from the preconditions and achieved states of the individual events called from the storage unit 27 and registers the created event sequence with the event sequence storage unit 7 as a new event sequence.

In step S405, the creation unit 28 notifies the detection state management unit 8 that the event sequence storage unit 7 is updated. Then, the processing ends.

In step S402, if the inputted event X is not determined as a new event sequence, then in step S406, the creation unit 28 checks whether or not the inputted event X is determined by the determination unit 25 or estimation unit 26 as addable to the existing event sequence. If the inputted event X is determined as addable, the creation unit 28 moves to step S407 via Yes branch. If the inputted event X is determined as non-addable, the processing ends via No branch.

In step S407, the creation unit 28 calls an event having a dependency with the event X, from the storage unit 27. At this time, the dependency is determined by the relations between the preconditions and achieved states of the events stored in the storage unit 27.

In step S408, the creation unit 28 adds the event X to the event sequence that includes an event having the precondition of the inputted event X as its achieved state.

In step S409, the creation unit 28 carries out a process of creating event sequences from the preconditions and achieved states of the individual events called from the storage unit 27 and sequentially adding the created event sequences to the event sequence to which the event X has been added in step S408.

In step S410, the creation unit 28 updates the pre-addition event sequence in the event sequence storage unit 7 with the post-addition event sequence and carries out the process of step S405. Then, the processing ends.

As has been described above, according to the invention of Embodiment 1, a parameter is defined for each event to represent whether or not the event can be observed by a system. If the system is unable to observe an event, it is presumed that a matching event has been observed. The dependency with the matching event is estimated dynamically, and an event sequence is created. Hence, even when an event the system is unable to observe is included, an event sequence can be created, providing the effect of preventing detection pass-through of a multi-stage attack.

Embodiment 2

According to Embodiment 1 described above, an event sequence is created by treating an event the system cannot observe, as having occurred. According to Embodiment 2, where a certain event A cannot be observed, if both an event B satisfying the precondition of the event A and an event X having the achieved state of the event A as its precondition are observed, an event sequence is created by treating the event A as having occurred, so that the detection precision is further improved.

Figure 9:
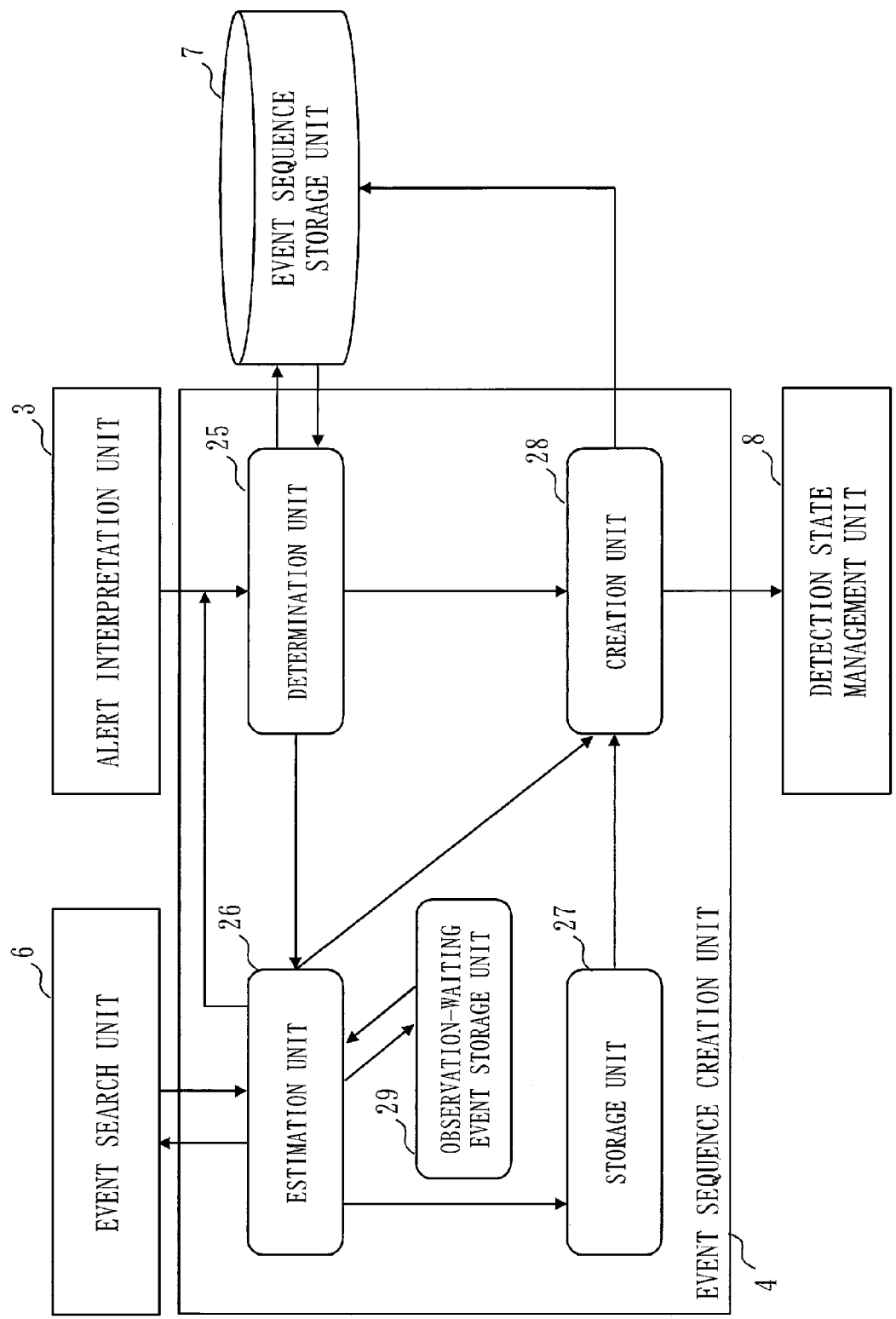
FIG. 9 is a configuration diagram illustrating a configuration example of an event sequence creation unit of an attack detection device according to Embodiment 2.

FIG. 9 is a configuration diagram illustrating a configuration example of an event sequence creation unit of an attack detection device according to Embodiment 2.

Referring to FIG. 9, an event sequence creation unit 4, a determination unit 25, a storage unit 27, and a creation unit 28 have the same configurations as those of Embodiment 1. An estimation unit 26 and an observation-waiting event storage unit 29 will be described hereinafter.

The estimation unit 26 requests an event search unit 6 to search for an event having a dependency with the inputted event X. If the event A obtained as the result of search is an event the system cannot observe, the event A is stored to the observation-waiting event storage unit 29. At this time, the event X inputted to the estimation unit 26 is stored to the storage unit 27.

Furthermore, the creation unit 28 inputs the un-observable event A to the determination unit 25, and it is determined whether or not the event A can be added to the event sequence. If the determination unit 25 determines the non-observable event A as addable to the event sequence (cases where the event B having a dependency with the non-observable event A has already been observed), an event sequence is created by treating the event A as having occurred.

If the determination unit 25 determines the non-observable event A as non-addable to the event sequence and that an estimation is necessary (cases where an event having a dependency with the non-observable event A is not observed yet), the non-observable event A is inputted to the estimation unit 26 again. At this time, since the event A inputted to the estimation unit 26 already exists in the storage unit 27, the estimation unit 26 determines that the event A stored in the storage unit 27 has not occurred and that the event X first inputted to the estimation unit is a new event sequence.

If no event is estimated by the estimation unit 26, the inputted attack event is determined as a new event sequence. The inputted attack event is inputted to the creation unit 28 and an event sequence is created.

The operation of the event sequence creation unit 4 of the attack detection device according to Embodiment 2 will now be described.

An attack event outputted from an alert interpretation unit 3 is inputted to the determination unit 25. The operation of the determination unit 25 is the same as that in FIG. 6. The attack event inputted to the determination unit 25 is then inputted to the estimation unit 26 or creation unit 28 depending on the processing in the determination unit 25.

The operation of the estimation unit 26 will now be described.

Figure 10:
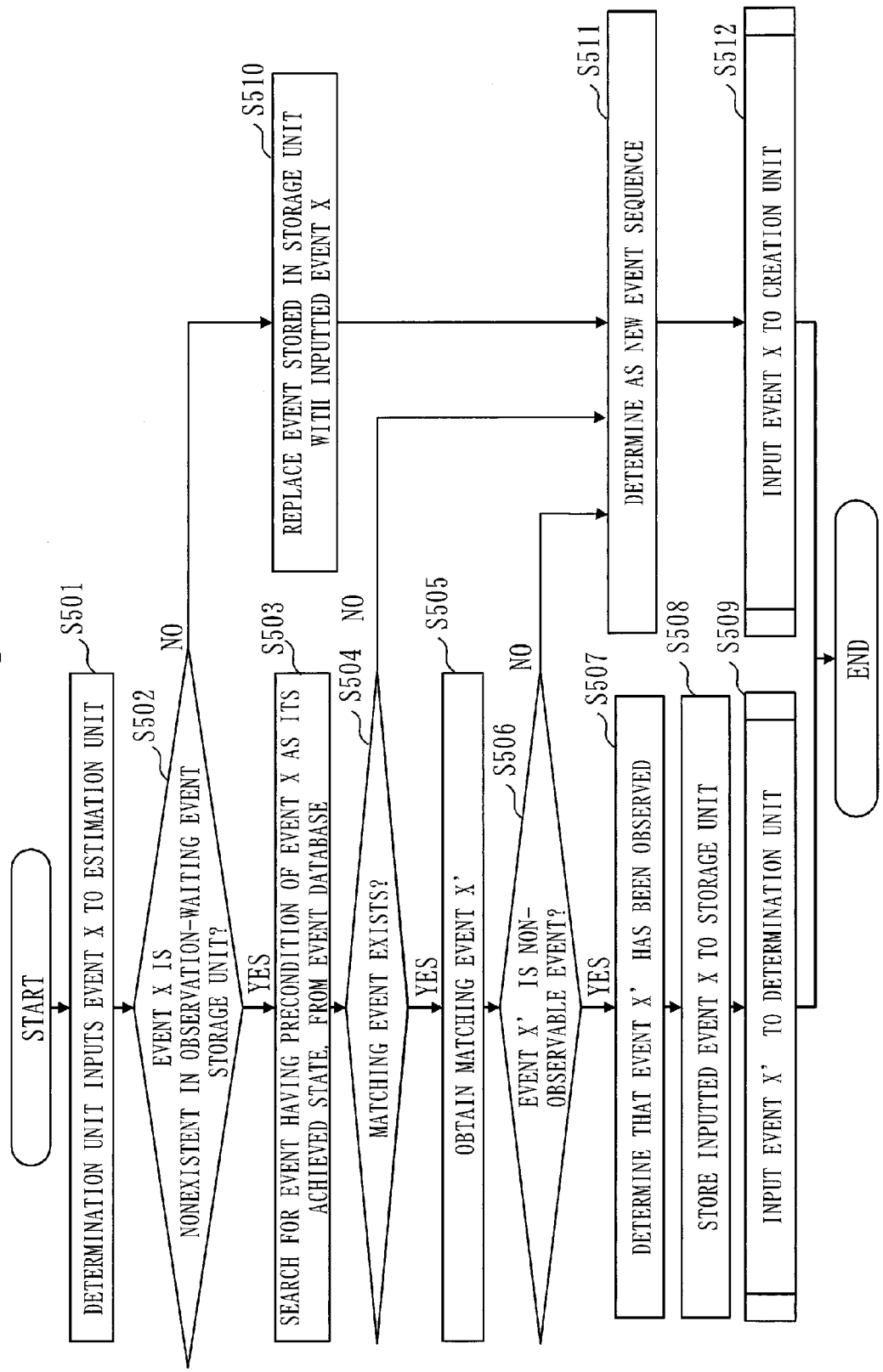
FIG. 10 is a flowchart illustrating a flow of a process of an estimation unit 26 according to Embodiment 2.

FIG. 10 is a flowchart illustrating a flow of a process of the estimation unit 26 according to Embodiment 2.

First, in step S501, the determination unit 25 inputs the event X to the estimation unit 26.

Then, in step S502, the estimation unit 26 checks whether or not the inputted event X is nonexistent in the storage unit 27. If the inputted event X is nonexistent in the storage unit 27, the estimation unit 26 moves to step S503 via Yes branch. If the inputted event X is existent in the storage unit 27, the estimation unit 26 moves to step S510 via No branch.

In step S503, the estimation unit 26 requests the event search unit 6 to search for an event having the precondition of the event X as its achieved state. This event is searched for from an event database 5.

In step S504, the estimation unit 26 checks whether or not an event that matches the search request exists. If an event that matches the search request exists (in this case, it is assumed that two or more matching events do not exist), the estimation unit 26 moves to step S505 via Yes branch. If an event that matches the search request does not exist, the estimation unit 26 moves to step S511 via No branch.

In step S505, the estimation unit 26 obtains an event X' that matches the search request, from the event search unit 6.

In step S506, the estimation unit 26 checks whether or not the event X' is a non-observable event, from the setting of the observation availability. If the event X' is a non-observable event, the estimation unit 26 moves to step S507 via Yes branch. If the event X' is an observable event, the estimation unit 26 moves to step S511 via No branch.

Then, in step S507, the estimation unit 26 determines that the event X' has already been observed. In step S508, the estimation unit 26 stores the inputted event X to the storage unit 27. In step S509, the estimation unit 26 inputs the event X' to the determination unit. Then, the processing ends.

If the event X' is an observable event in step S506, or if an event that matches the search request does not exist in step S504, then in step S511, the estimation unit 26 determines that the inputted event X is a new event sequence. In step S512, the estimation unit 26 inputs the event X to the creation unit 28. Then, the processing ends.

In step S502, if the inputted event X exists in the observation-waiting event storage unit 27, then in step S510, the estimation unit 26 replaces the event X stored in the storage unit 27 with an event (corresponding to the last inputted event) having a dependency with the event X. After that, in step S511, the inputted event X is determined as a new event. In step S512, the event X is inputted to the creation unit 28. Then, the processing ends.

The operation of a case where the event is inputted to the creation unit 28 by the process in the determination unit 25 or estimation unit 26 is the same as that of Embodiment 1.

As described above, according to the invention of Embodiment 2, where a certain event A cannot be observed, if both an event B satisfying the precondition of the event A and an event X having the achieved state of the event A as its precondition are observed, an event sequence is created by treating the event A as having occurred, so that the detection precision is further improved.

Embodiment 3

In Embodiment 2 described above, an event the system cannot observe is treated as having occurred, depending on whether or not an immediately preceding event and an immediately following event are observed. However, since the dependent degrees (occurrence probabilities) among events are not evaluated, an event that cannot possibly be believed to have been actually observed might be treated as having been observed. In view of this, according to Embodiment 3, whether an event in question is an event the system cannot observe is evaluated using the occurrence probability of event linkage. When the occurrence probability exceeds a threshold value, it is determined that the event in question has actually occurred.

Figure 11:
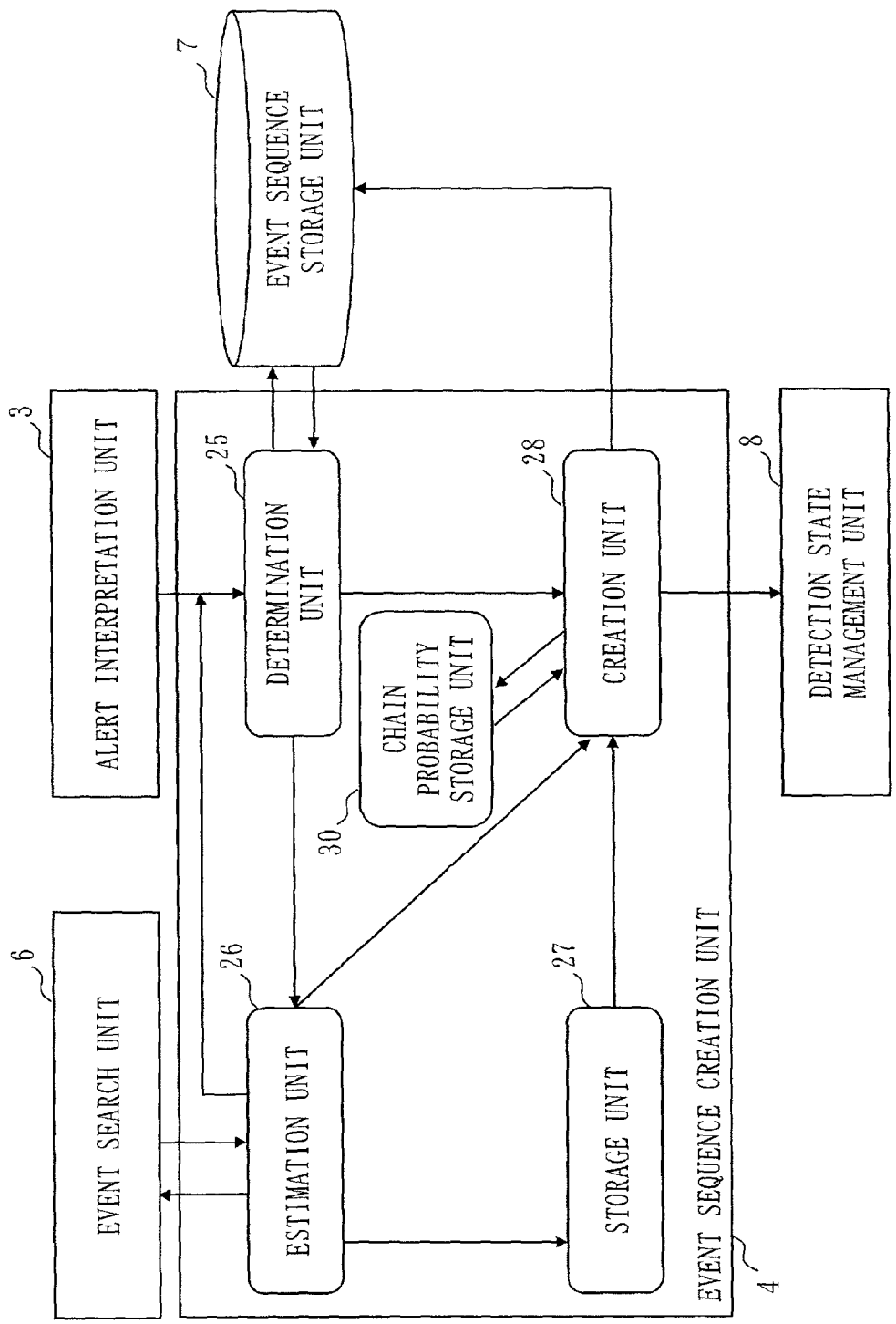
FIG. 11 is a configuration diagram illustrating a configuration example of an event sequence creation unit 4 according to Embodiment 3.

FIG. 11 is a configuration diagram illustrating a configuration example of an event sequence creation unit 4 according to Embodiment 3.

Referring to FIG. 11, the event sequence creation unit 4 is provided with a chain probability storage unit 30 which stores a chain probability being the probability at which a plurality of events occur in a chain, in addition to the configuration of FIG. 5.

The operation of the event sequence creation unit 4 according to Embodiment 3 will now be described.

An attack event outputted from an alert interpretation unit 3 is inputted to a determination unit 25. The operation of the determination unit 25 is the same as that of FIG. 6. The attack event inputted to the determination unit 25 is then inputted to an estimation unit 26 or a creation unit 28 depending on the processing in the determination unit 25.

Figure 12:
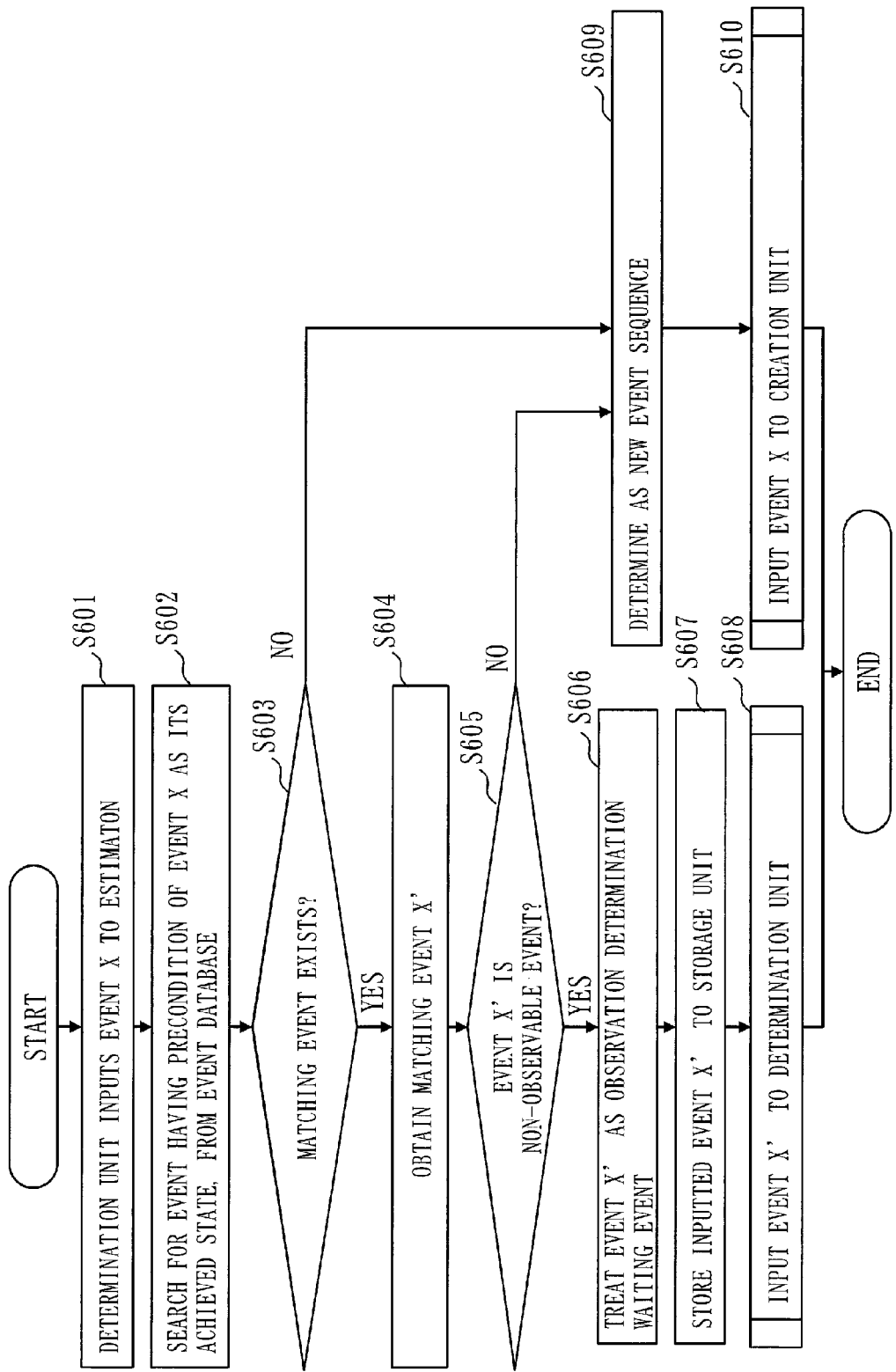
FIG. 12 is a flowchart illustrating a flow of a process of an estimation unit 26 according to Embodiment 3.

FIG. 12 is a flowchart illustrating a flow of a process of the estimation unit 26 according to Embodiment 3.

The flow of the process of the estimation unit 26 according to Embodiment 3 will be described with reference to FIG. 12.

First, the process of steps S601 to S605 is the same as the process of steps S301 to S305 of the estimation unit 26 of Embodiment 1 illustrated in FIG. 7.

Then, in step S606, if an event X' is an event the system cannot observe, the estimation unit 26 adds to the event X' information indicating that the event X' is an observation determination waiting event. For example, this information is flag information in which 1 is set in case of an observation determination waiting event and 0 is set in case of an observation determination non-waiting event.

The process of steps S607 to S610 is the same as the process of steps S307 to S310 of the estimation unit 26 of Embodiment 1 illustrated in FIG. 7.

Figure 13:
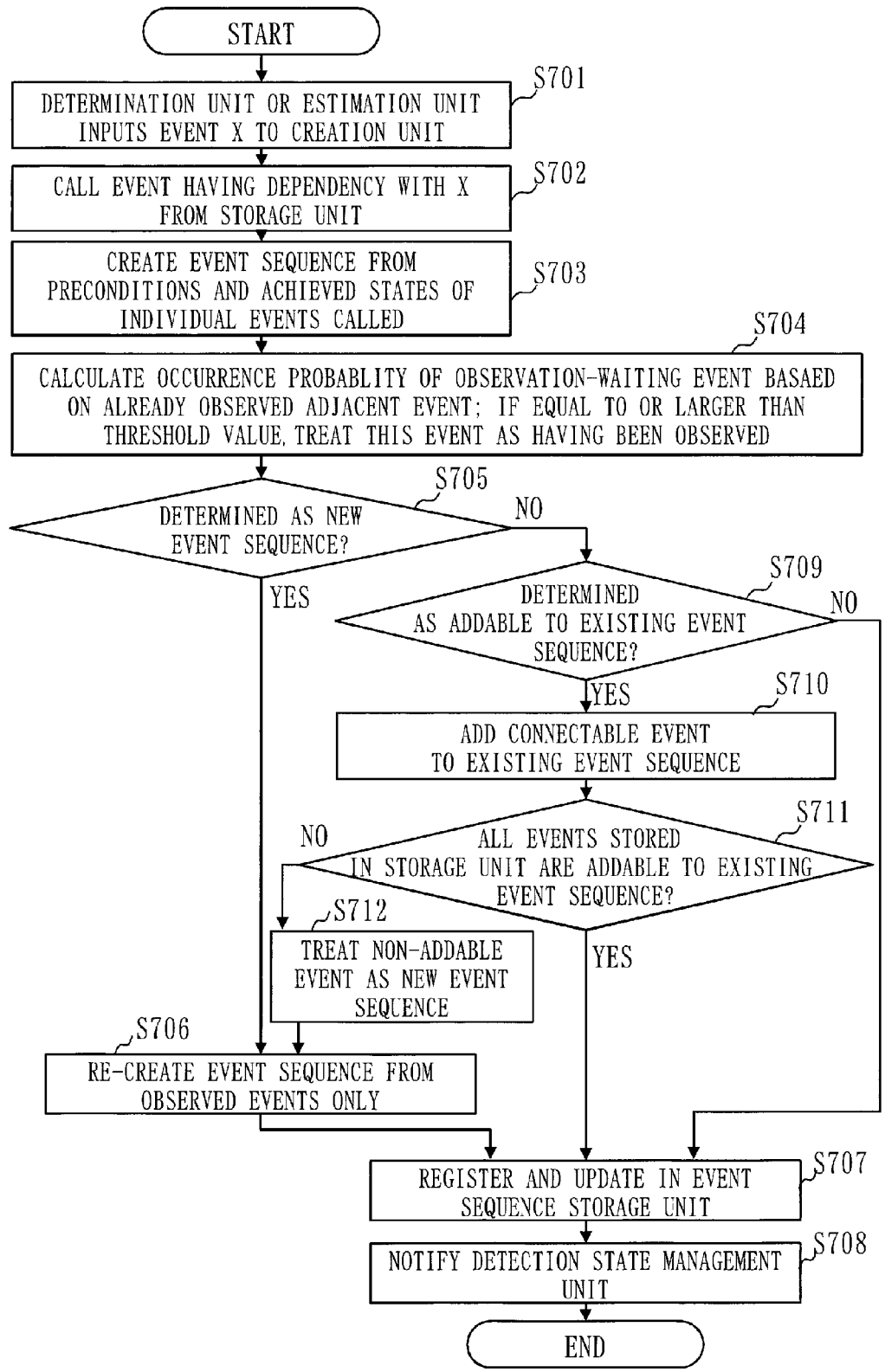
FIG. 13 is a flowchart illustrating a flow of a process of a creation unit 28 according to Embodiment 3.

FIG. 13 is a flowchart illustrating a flow of a process of the creation unit 28 according to Embodiment 3.

The flow of the process of the creation unit 28 according to Embodiment 3 will now be described with reference to FIG. 13.

First, in step S701, the determination unit 25 or estimation unit 26 inputs an event X to the creation unit 28.

Then, in step S702, the creation unit 28 calls an event having a dependency with the event X from a storage unit 27. At this time, the dependency is determined in accordance with the relations between the preconditions and achieved states of the events stored in the storage unit 27.

Then, in step S703, the creation unit 28 creates an event sequence from the preconditions and achieved states of the individual events called from the storage unit 27.

In step S704, for the event sequence created in step S703, the creation unit 28 calculates the occurrence probability of the observation-waiting event based on an already observed adjacent event. The occurrence probability is given as a conditional probability of a case where a plurality of events occur in a chain, by accumulating, for example, data on past event occurrence cases and utilizing the statistical data. The chain probability of the plurality of events is stored in the chain probability storage unit 30. When the calculated occurrence probability for an observation-waiting event is equal to or larger than a preset threshold value, the creation unit 28 determines that this observation-waiting event has been observed.

In step S705, the creation unit 28 checks whether the inputted event X is determined as a new event sequence by the determination unit 25 or estimation unit 26. If the inputted event X is determined as a new event sequence, the creation unit 28 moves to step S706 via Yes branch. If the inputted event X is not determined as a new event sequence, the creation unit 28 moves to step S709 via No branch.

In step S706, the creation unit 28 re-creates an event sequence from observed events only. At this time, the event sequence to be re-created may include a plurality of event sequences.

In step S707, the creation unit 28 registers the re-created event sequence to an event sequence storage unit 7.

In step S708, the creation unit 28 notifies a detection state management unit 8 that the event sequence storage unit 7 is updated. Then, the processing ends.

If it is determined in step S705 that the inputted event X is not a new event sequence, then in step S709, the creation unit 28 checks whether the inputted event X is determined by the determination unit 25 or estimation unit 26 as addable to the existing event sequence. If the inputted event X is determined as addable, the creation unit 28 moves to step S710 via Yes branch. If the inputted event X is determined as non-addable, the creation unit 28 moves to step S707 via No branch. Registration and update of the event sequence storage unit are performed, and after that the process of step S708 is performed. Then, the processing ends.

In step S710, the creation unit 28 adds the connectable event to the existing event sequence.

In step S711, the creation unit 28 checks whether all the events stored in the storage unit are addable to the existing event sequence. If all the events stored in the storage unit are determined as addable, the creation unit 28 moves to step S707 via Yes branch. Registration and update of the event sequence storage unit are performed, and after that the process of step S708 is performed. Then, the processing ends. If all the events stored in the storage unit are determined as non-addable, the creation unit 28 moves to step S712 via No branch.

In step S712, the creation unit 28 treats a non-addable event as a new event sequence and carries out the process of steps S706 to S708. Then, the processing ends.

As described above, according to the invention of Embodiment 3, regarding a non-observable event, the occurrence probability is calculated based on an already observed event having a dependency with it. This enables creating an event sequence to include an evaluation as to whether the non-observable event can be treated as having been observed. The detection precision is accordingly further improved.

Embodiment 4

Embodiments 1 to 3 described above present schemes for attack event estimation of an attack event a system cannot observe. Embodiment 4 presents an embodiment in which an event sequence is created by estimating an attack event the system cannot observe due to detection pass-through.

Figure 14:
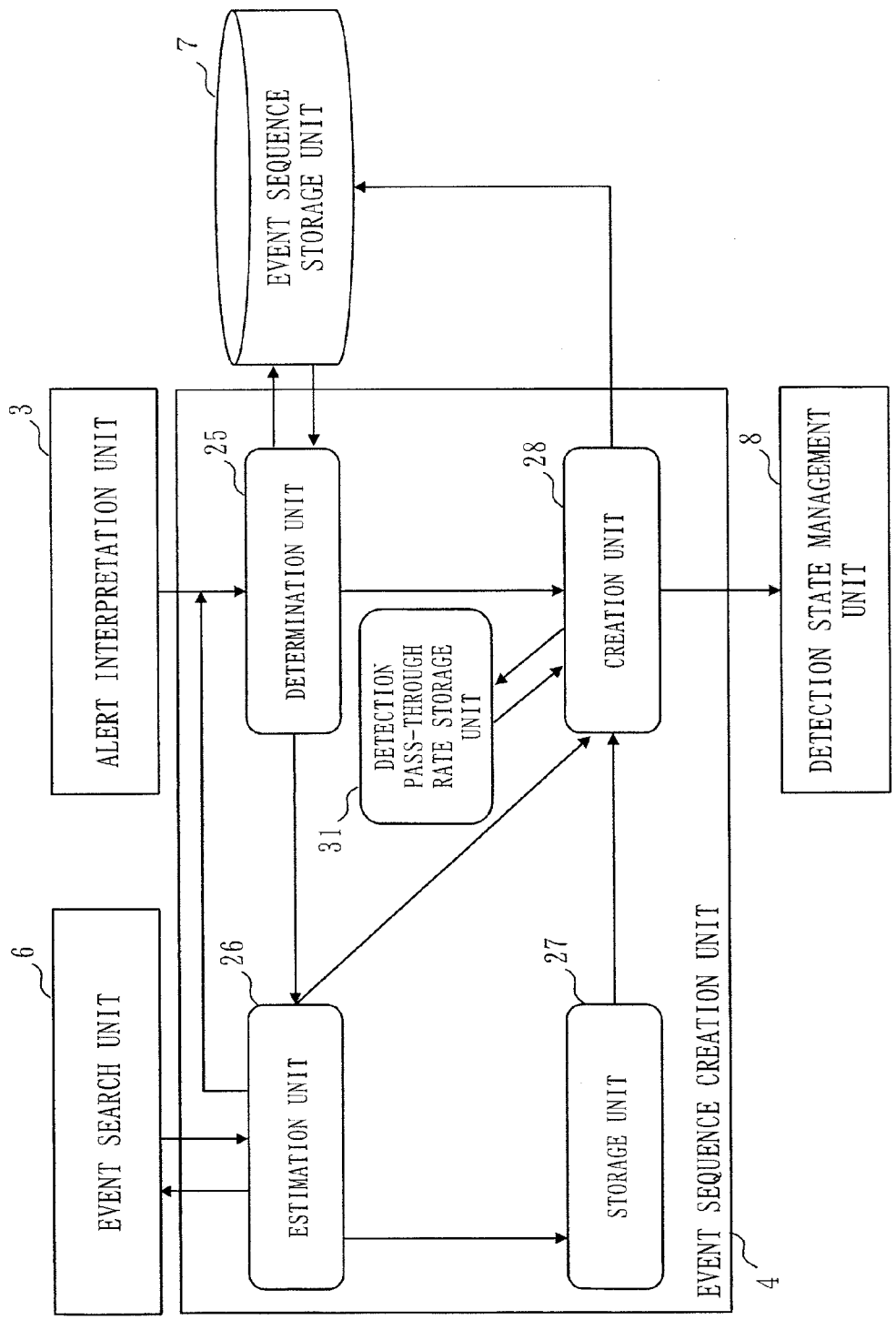
FIG. 14 is a configuration diagram illustrating a configuration example of an event sequence creation unit 4 according to Embodiment 4.

FIG. 14 is a configuration diagram illustrating a configuration example of an event sequence creation unit 4 according to Embodiment 4.

Referring to FIG. 14, the event sequence creation unit 4 is provided with a detection pass-through rate storage unit 31 which stores an event detection pass-through rate, in addition to the configuration of FIG. 5.

The operation of the event sequence creation unit 4 according to Embodiment 4 will be described.

An attack event outputted from an alert interpretation unit 3 is inputted to a determination unit 25. The operation of the determination unit 25 is the same as in FIG. 6. The attack event inputted to the determination unit 25 is then inputted to an estimation unit 26 or creation unit 28 depending on the processing in the determination unit 25.

Figure 15:
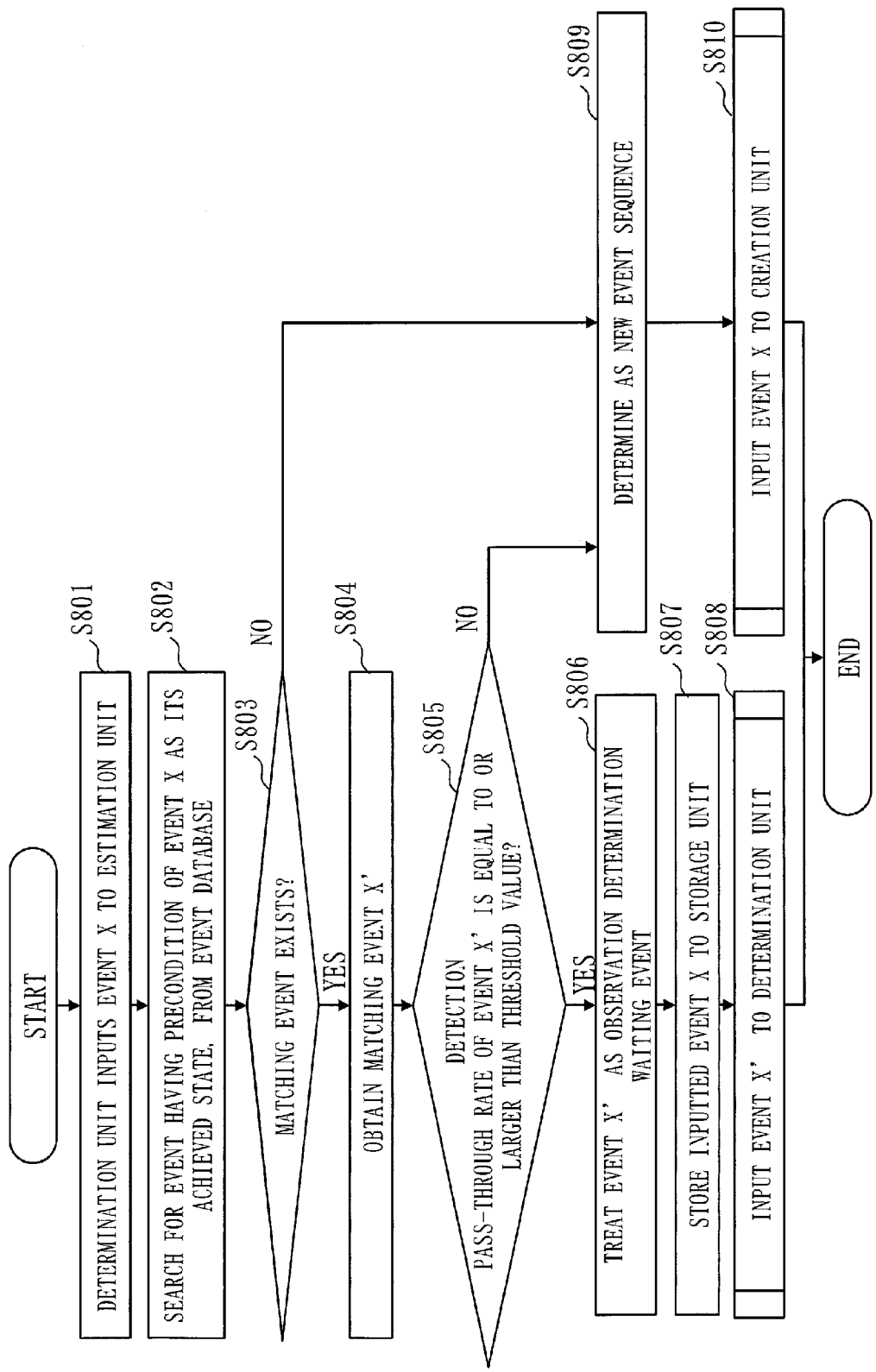
FIG. 15 is a flowchart illustrating a flow of a process of an estimation unit 26 according to Embodiment 4.

FIG. 15 is a flowchart illustrating a flow of a process of the estimation unit 26 according to Embodiment 4.

The flow of the process of the estimation unit 26 according to Embodiment 4 will now be described with reference to FIG. 15.

First, the process of steps S801 to S804 is the same as the process of S301 to S304 of the estimation unit 26 in Embodiment 1 illustrated in FIG. 7.

Then, in step S805, the estimation unit 26 checks the detection pass-through rate of an event X' by referring to the detection pass-through rate storage unit 31, and determines whether or not the detection pass-through rate is equal to or larger than a preset threshold value. As the detection pass-through rate to be stored in the detection pass-through rate storage unit 31, for example, one is employed which is obtained by accumulating data of event detection pass-through cases occurring in the past and calculating a detection pass-through rate utilizing such statistic data. If the detection pass-through rate is equal to or larger than the threshold value, the estimation unit 26 moves to step S806 via Yes branch. If the detection pass-through rate is less than the threshold value, the estimation unit 26 moves to step S809 via No branch.

The process of steps S806 to S810 is the same as the process of S306 to S310 of the estimation unit 26 of Embodiment 1 illustrated in FIG. 7.

As described above, according to the invention of Embodiment 4, a percentage of detection pass-through at which detection pass-through occurs is defined for each event in advance. When the detection pass-through rate is equal to or larger than the threshold value, the event is determined as having been observed. Even where an event that cannot be observed due to detection pass-through is included, an event sequence can be created. The detection precision is accordingly further improved.

Embodiment 5

Embodiments 1 to 4 described above do not assume that a plurality of preconditions are required for event sequence creation, but presume that an event sequence forms one row. Embodiment 5 presents an embodiment in which event occurrence is estimated even in cases where an event sequence is created by a plurality of preconditions, so that an event sequence can be created.

Figure 16:
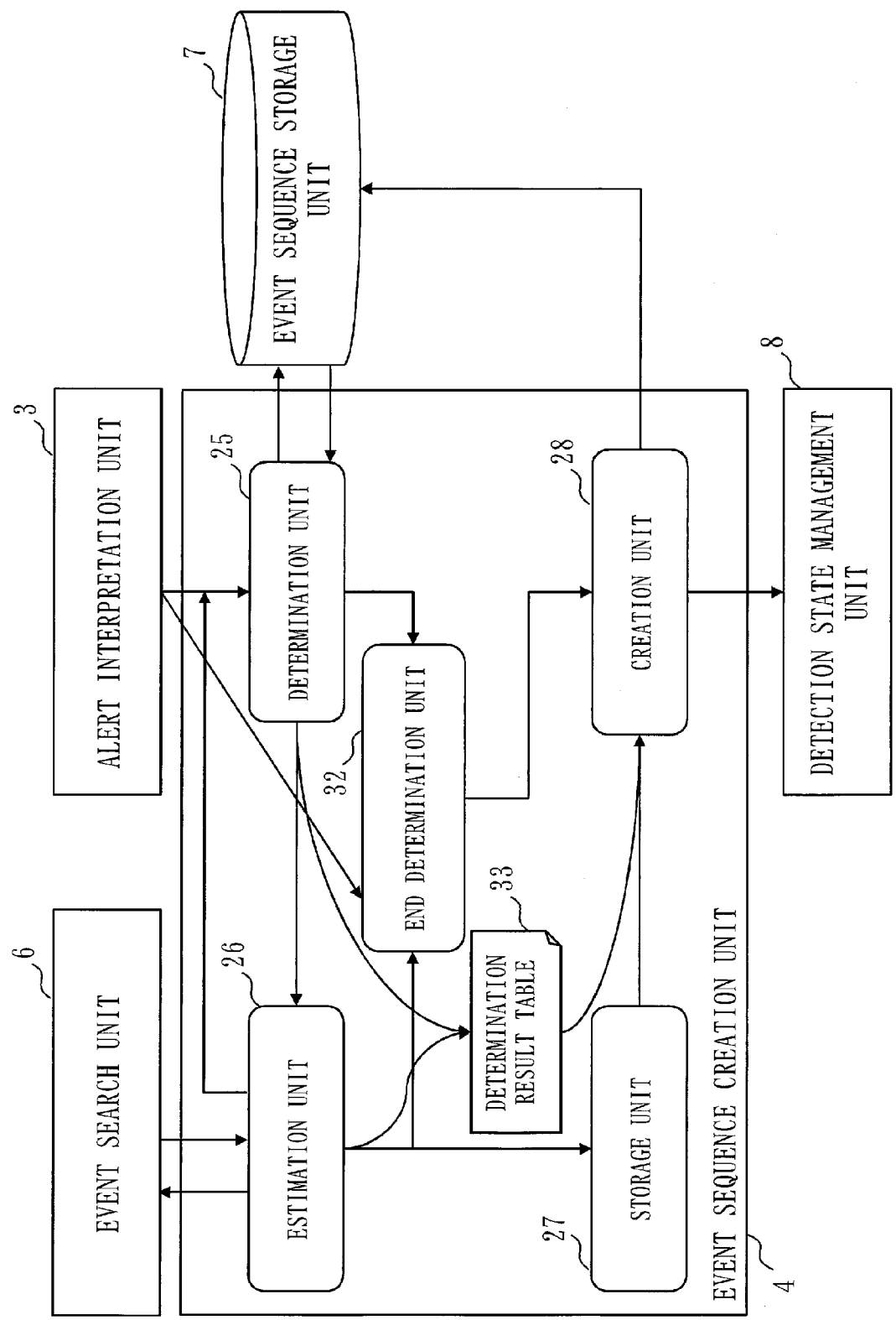
FIG. 16 is a configuration diagram illustrating a configuration example of an event sequence creation unit 4 according to Embodiment 5.

FIG. 16 is a configuration diagram illustrating a configuration example of an event sequence creation unit 4 according to Embodiment 5.

Referring to FIG. 16, the event sequence creation unit 4 is provided with an end determination unit 32 which determines the end of an estimation process for an attack event, and a determination result table 33 which stores a determination result of a determination unit 25 and estimation unit 26, in addition to the configuration of FIG. 5.

FIG. 17 is a diagram illustrating a storing example of the determination result table 33 according to Embodiment 5.

FIG. 17 illustrates a case in which an event "password leak" being an event the system cannot observe is treated as having occurred from the estimation result of the estimation unit 26, and an occurrence determination is made as "YES".

The determination unit 25 verifies whether or not an attack event inputted from an alert interpretation unit 3 is addable to an event sequence registered to an event sequence storage unit 7. If the inputted attack event is non-addable to the event sequence, the determination unit 25 determines that estimation of a non-observed event is necessary. When it is determined that estimation of a non-observed event is necessary, the estimation unit 26 carries out estimation. If it is determined that the inputted attack event is addable to an existing event sequence in the event sequence storage unit 7, or is a new event sequence, the determination result is added to the determination result table 33. Then, the inputted attack event is inputted to the end determination unit 32, and an end of the estimation process of the attack event is determined.

The estimation unit 26 requests an event search unit 6 to search for an attack event having a dependency with the inputted attack event, and receives a search result of the event search unit 6. Regarding individual attack events of the search result, if an attack event of the search result is an attack event the system cannot observe, it is determined that an attack event newly obtained by a search has been observed. Each attack event treated as having been observed is inputted to the determination unit 25. Estimation is performed recursively until it is determined that the inputted attack event is addable to the existing event sequence in the event sequence storage unit 7, or is a new event sequence.

When estimation is carried out for all the attack events having a dependency with the attack event inputted to the estimation unit 26, it is checked whether or not all preconditions that are necessary in order that the inputted attack events are observed are satisfied, and the check result is added to the determination result table 33. After that, the attack event inputted to the estimation unit 26 is stored to a storage unit 27, and an attack event inputted to the end determination unit 32 is inputted to a creation unit 28.

For the attack event inputted from the end determination unit 32, the creation unit 28 calls an attack event that depends on the inputted attack event, from the storage unit 27. After that, the creation unit 28 creates an event sequence from the individual attack events called. In event sequence creation, based on the determination result table 33, an attack event determined as a new event sequence is treated as an independent event sequence.

Then, the creation unit 28 connects an event sequence including an addable event, to the event sequence registered in the event sequence storage unit 7. At this time, where a plurality of event sequences registered in the event sequence storage unit 7 are connectable, the creation unit 28 connects them to form one event sequence. An attack event determined by the estimation unit 26 as not satisfying some or all of the preconditions necessary for observation is excluded from event sequence creation.

After the above process is carried out, the creation unit 28 registers and updates, in the event sequence storage unit 7, the new created event sequence and an event sequence which is connected to the event sequence registered in the event sequence storage unit 7. The creation unit 28 notifies the detection state management unit 8 that an event sequence is updated by creation of an event sequence.

The end determination unit 32 stores the attack event inputted from the alert interpretation unit 3, as an initial event. After that, when a new attack event is inputted, the end determination unit 32 carries out comparison to check whether the new attack event is the same as the initial event. When an event that is the same as the initial event is inputted, the end determination unit 32 inputs the initial event to the creation unit 28.

The operation of the event sequence creation unit 4 according to this embodiment will be described in detail hereinafter. The attack event outputted from the alert interpretation unit 3 is inputted to the determination unit 25 and end determination unit 32.

The operation of the determination unit 25 will be described hereinafter.

Figure 18:
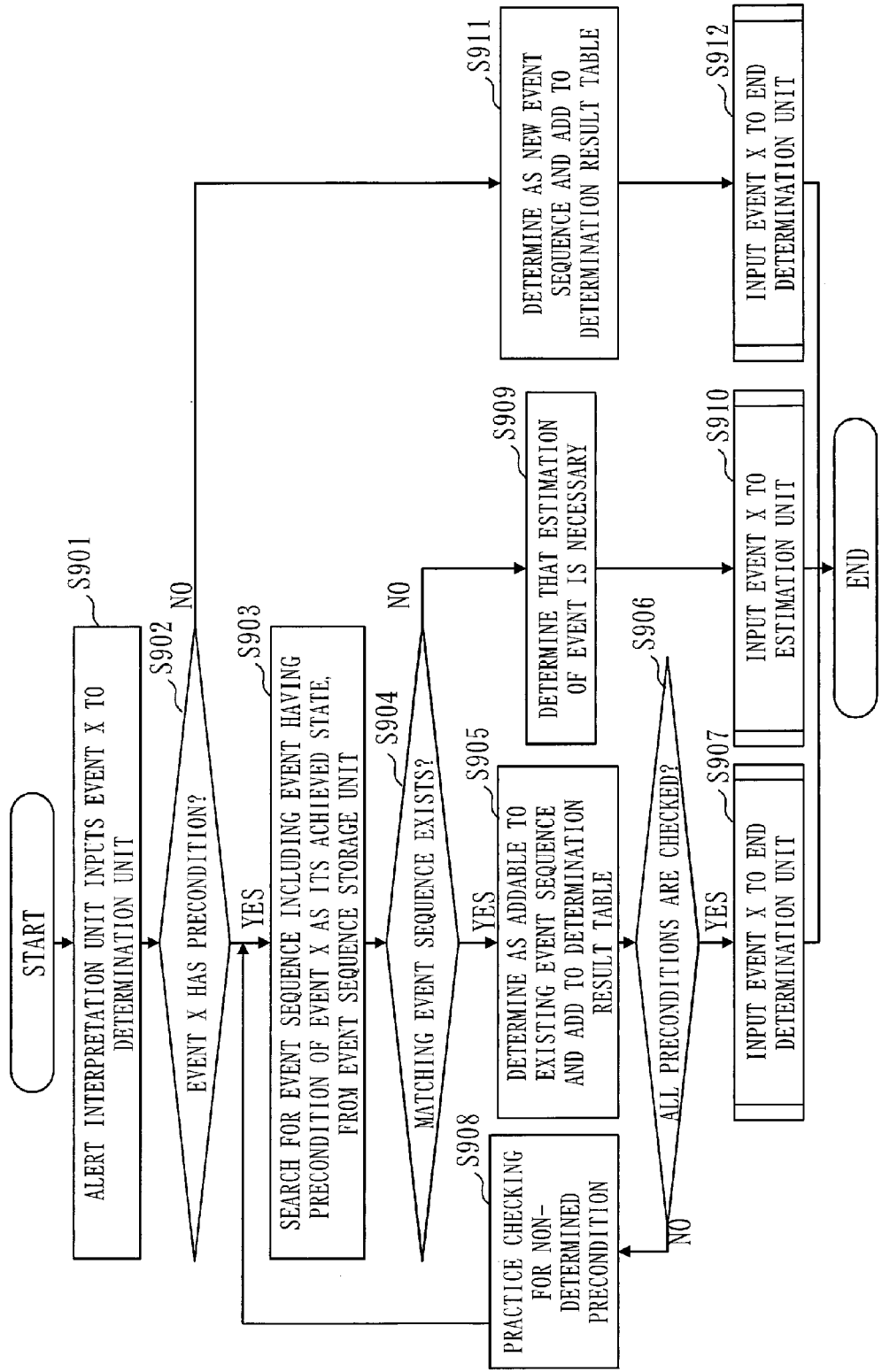
FIG. 18 is a flowchart illustrating a flow of a process of a determination unit 25 according to Embodiment 5.

FIG. 18 is a flowchart illustrating a flow of a process of the determination unit 25 according to Embodiment 5.

The process of steps S901 to S904 is the same as the process of steps S201 to S204 of the determination unit 25 of Embodiment 1 illustrated in FIG. 6.

Then, if a matching event sequence exists in step S904, then in step S905, the determination unit 25 determines that an inputted event X is addable to the existing event sequence, and this determination result is added to the determination result table 33.

In step S906, where a plurality of preconditions exist, the determination unit 25 checks whether or not all the preconditions are checked. If all the preconditions are checked, the determination unit 25 moves to step S907 via Yes branch and inputs the event X to the end determination unit 32. Then, the processing ends.

If all the preconditions are not checked in step S906, the determination unit 25 moves to step S908 via No branch and practices checking for preconditions that are not checked yet. Then, the determination unit 25 returns to step S903 and continues practicing the process of checking.

If a matching event sequence does not exist in step S904, then in step S909, the determination unit 25 determines that estimation of an event is necessary. The event X is inputted to the estimation unit 26 in step S910. Then, the processing ends.

In step S902, if the event X is an event that does not have a precondition, then in step S911, the determination unit 25 determines that the inputted event X is a new event sequence. In step S912, the determination unit 25 inputs the event X to the end determination unit 32. Then, the processing ends.

The operation conducted when inputting an attack event being outputted from the alert interpretation unit 3, to the end determination unit 32 will be described.

Figure 19:
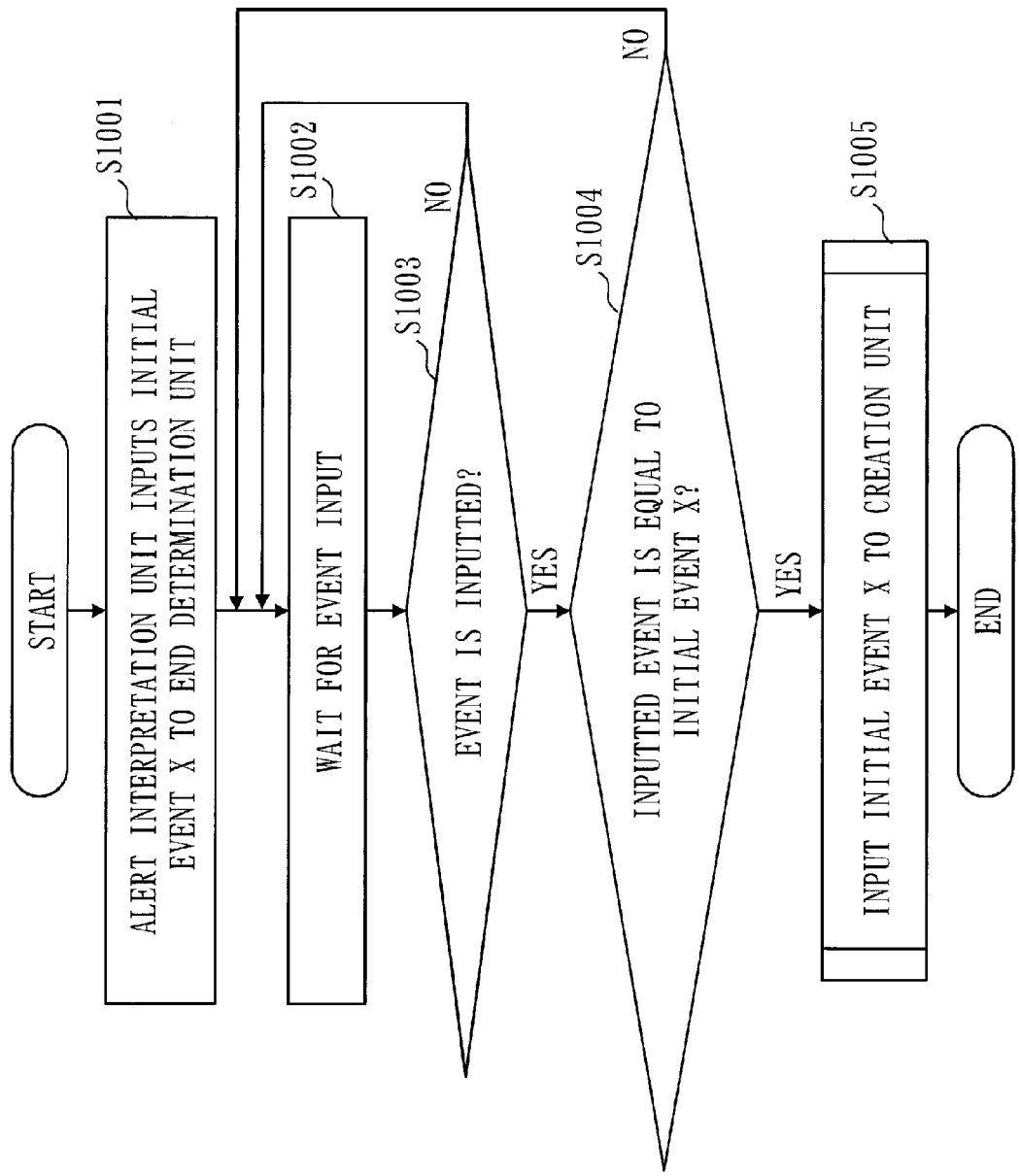
FIG. 19 is a flowchart illustrating a flow of a process of an end determination unit 32 according to Embodiment 5.

FIG. 19 is a flowchart illustrating a flow of a process of the end determination unit 32 according to Embodiment 5.

First, in step S1001, the alert interpretation unit 3 inputs an initial event X to the end determination unit 32.

Then, in step S1002 and step S1003, the end determination unit 32 waits for an event input from the determination unit 25 or estimation unit 26. If an event is not inputted in step S1003, the end determination unit 32 returns to step S1002 via No branch and waits for an event input again. If an event is inputted in step S1003, the end determination unit 32 moves to step S1004 via Yes branch.

In step S1004, the end determination unit 32 checks whether or not the inputted event is equal to the initial event X. If the inputted event is equal to the initial event X, the end determination unit 32 moves to step S1005 via Yes branch.

In step S1005, the end determination unit 32 inputs the initial event X to the determination unit 25. Then, the processing ends.

In step S1004, if the inputted event is different from the initial event X, then in step S1002, the end determination unit 32 waits for an input.

The flow of the process of the end determination unit 32 has been described above.

The event X inputted to the determination unit 25 is then inputted to the estimation unit 26 or end determination unit 32 depending on the processing in the determination unit 25. The operation conducted when the event X is inputted to the estimation unit 26 will be described hereinafter.

Figure 20:
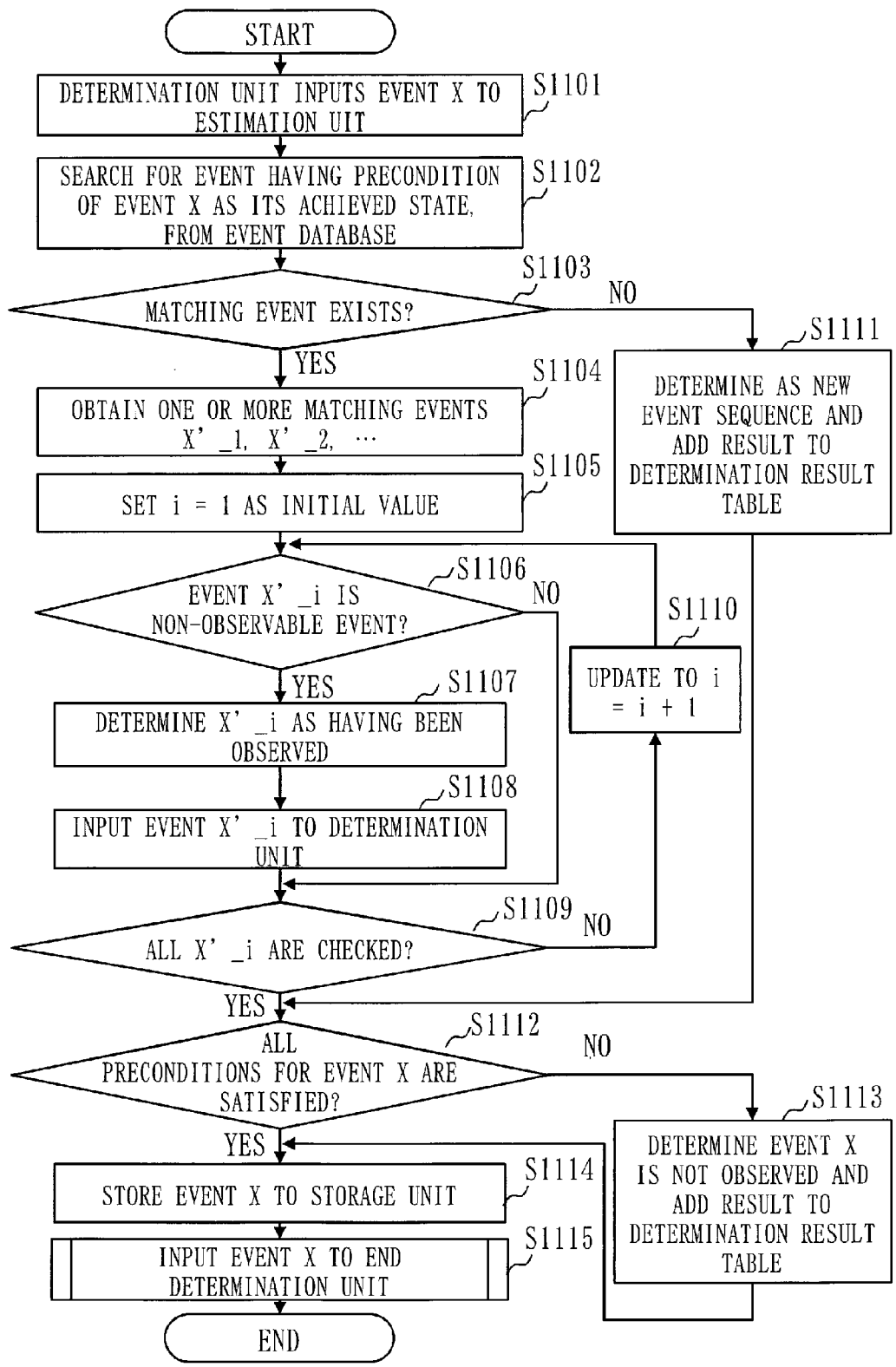
FIG. 20 is a flowchart illustrating a flow of a process of an estimation unit 26 according to Embodiment 5.

FIG. 20 is a flowchart illustrating a flow of a process of the estimation unit 26 according to Embodiment 5.

First, in step S1101, the determination unit 25 inputs the event X to the estimation unit 26.

Then, in step S1102, the estimation unit 26 requests the event search unit 6 to search for an event having the precondition of the event X as its achieved state. Then, such event is searched for from an event database 5.

In step S1103, the estimation unit 26 checks whether or not an event that matches the search request exists. If an event that matches the search request exists, the estimation unit 26 moves to step S1104 via Yes branch. If an event that matches the search request does not exist, the estimation unit 26 moves to step S1111 via No branch.

If an event that matches the search request does not exist in step S1103, then in step S1111, the estimation unit 26 determines that the inputted event X is a new event sequence, and adds the determination result to the determination result table 33. Then, the estimation unit 26 carries out the process of step S1112.

If an event that matches the search request exists in step S1103, then in step S1104, the estimation unit 26 obtains at least one matching event $(X'\_1, X'\_2, \ldots)$. After that, in step S1105, the estimation unit 26 initializes a variable i for repetitive process to 1.

Then in step S1106, if $X'\_i$ is an event the system cannot observe, the estimation unit 26 moves to step S1107 via Yes branch. If $X'\_i$ is not an event the system cannot observe, the estimation unit 26 moves to step S1109 via No branch.

In step S1107, the estimation unit 26 determines that the event has been observed. Then, in step S1108, the estimation unit 26 inputs the event $X'\_i$ to the determination unit 25. When the process of step S1108 ends, the estimation unit 26 carries out the process of step S1109.

In step S1109, the estimation unit 26 checks whether all the events $X'\_i$ obtained in step S1104 are checked. If all the events $X'\_i$ are checked, the estimation unit 26 moves to step S1112 via Yes branch. If all the events $X'\_i$ are not checked, the estimation unit 26 moves to step S1110 via No branch. The estimation unit 26 updates by increment the variable i for repetitive process. Then, the estimation unit 26 returns to step S1106.

In step S1112, the estimation unit 26 checks whether the inputted event X satisfies all the preconditions necessary for being observed. If the inputted event X satisfies all the preconditions, the estimation unit 26 moves to step S1114 via Yes branch. If the inputted event X does not satisfy some or all of the preconditions, the estimation unit 26 moves to step S1113 via No branch.

If the inputted event X does not satisfy some or all of the preconditions in step S1112, then in step S1113, the estimation unit 26 determines that the inputted event X is not observed, and adds the determination result to the determination result table 33. At this time, even when the inputted event X is treated in step S1107 as having been observed, the determination result of step S1113 precedes.

Where the inputted event X satisfies all the preconditions necessary for being observed in step S1112, or after the process of step S1113 is carried out, the estimation unit 26 stores the inputted event X to the storage unit 27 in step S1114. After that, in step S1115, the estimation unit 26 inputs the event X to the end determination unit 32.

An explanation will be made for an operation conducted when an attack event is inputted to the creation unit 28 due to the process in the end determination unit 32.

Figure 21:
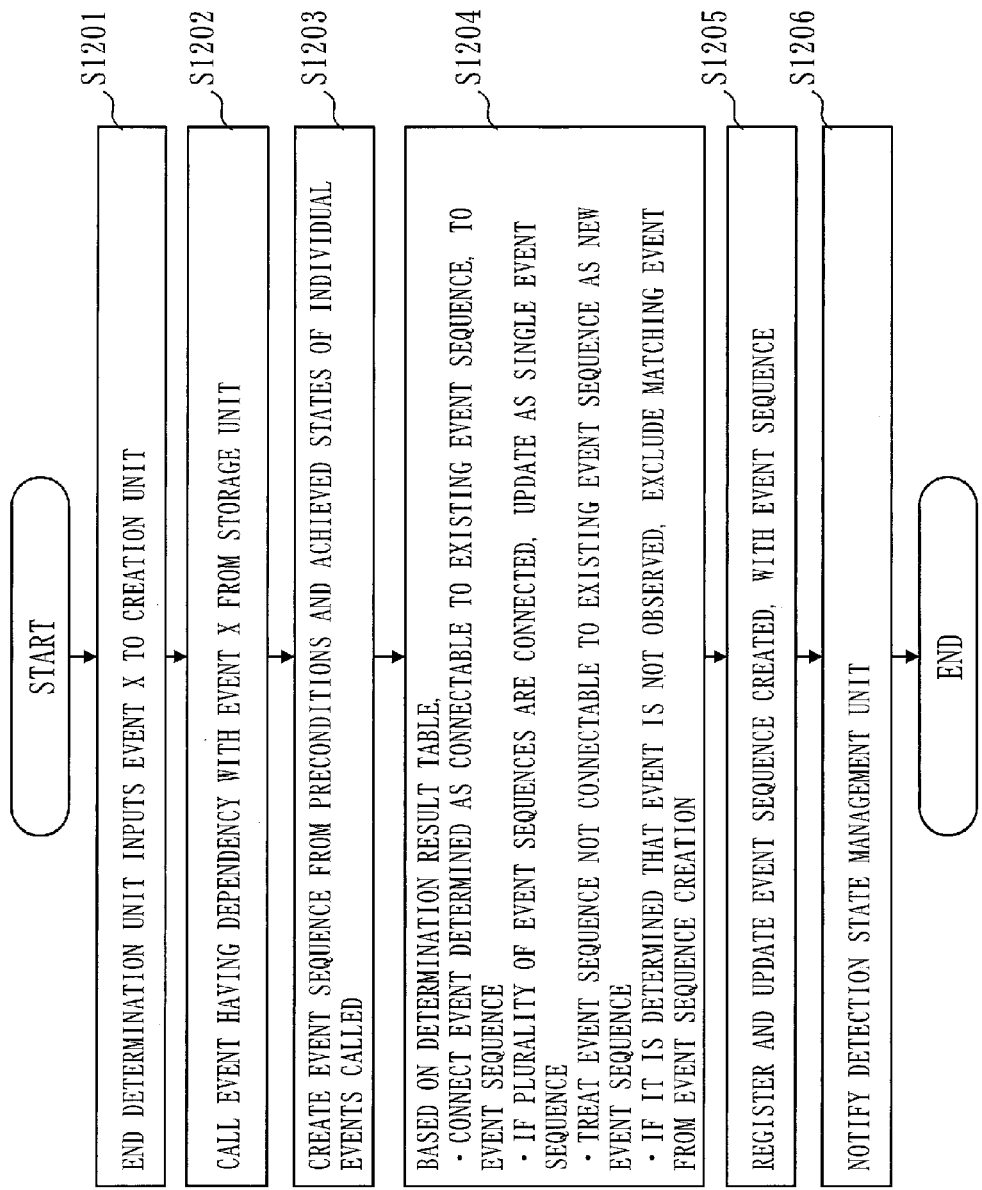
FIG. 21 is a flowchart illustrating a flow of a process of a creation unit 28 according to Embodiment 5.

FIG. 21 is a flowchart illustrating a flow of a process of the creation unit 28 according to Embodiment 5.

First, in step S1201, the end determination unit 32 inputs the event X to the creation unit 28.

Then, in step S1202, the creation unit 28 calls an event having a dependency with the event X, from the storage unit 27. At this time, the dependency is determined in accordance with the relations between the preconditions and achieved states of the events stored in the storage unit 27.

In step S1203, the creation unit 28 creates an event sequence from the preconditions and achieved states of the individual events called from the storage unit 27.

In step S1204, for the event sequence created in step S1203, the creation unit 28 carries out the following process based on the determination result table 33. First, the creation unit 28 connects the event determined as connectable to the existing event sequence registered in the event sequence storage unit 7, to the event sequence. At this time, if a plurality of event sequences registered in the event sequence storage unit 7 are connected, they are updated as one event sequence. An event sequence that cannot be connected to the existing event sequence is treated as a new event sequence. If an event is treated by the estimation unit 26 as not having been observed, a matching event is excluded from event sequence creation.

Then, in step S1205, the creation unit 28 registers and updates the created new event sequence, or the event sequence obtained by connection to the event sequence registered in the event sequence storage unit 7, in the event sequence storage unit 7.

Finally, in step S1206, the creation unit 28 notifies the detection state management unit 8 that the event sequence storage unit 7 is updated by creating an event sequence. Then, the processing ends.

As described above, according to the invention of Embodiment 5, estimation of event occurrence is carried out even in cases where an event sequence is created by a plurality of preconditions, so that creation of an event sequence is enabled. As a result, also regarding attack events having complicated preconditions, a non-observable attack event can be estimated. Thus, the versatility of Embodiments 1 to 4 according to the present invention can be enhanced.

Embodiment 6

In Embodiments 1 to 6 described above, an event sequence is created by searching backward for events that occurred in the past, utilizing the precondition of the observed attack event. Embodiment 6 presents an embodiment in which an attack event which is expected to be observed next from the result of an observed attack event is stored, so that it is possible to determine efficiently whether a newly observed attack event is addable to an existing event sequence.

Figure 22:
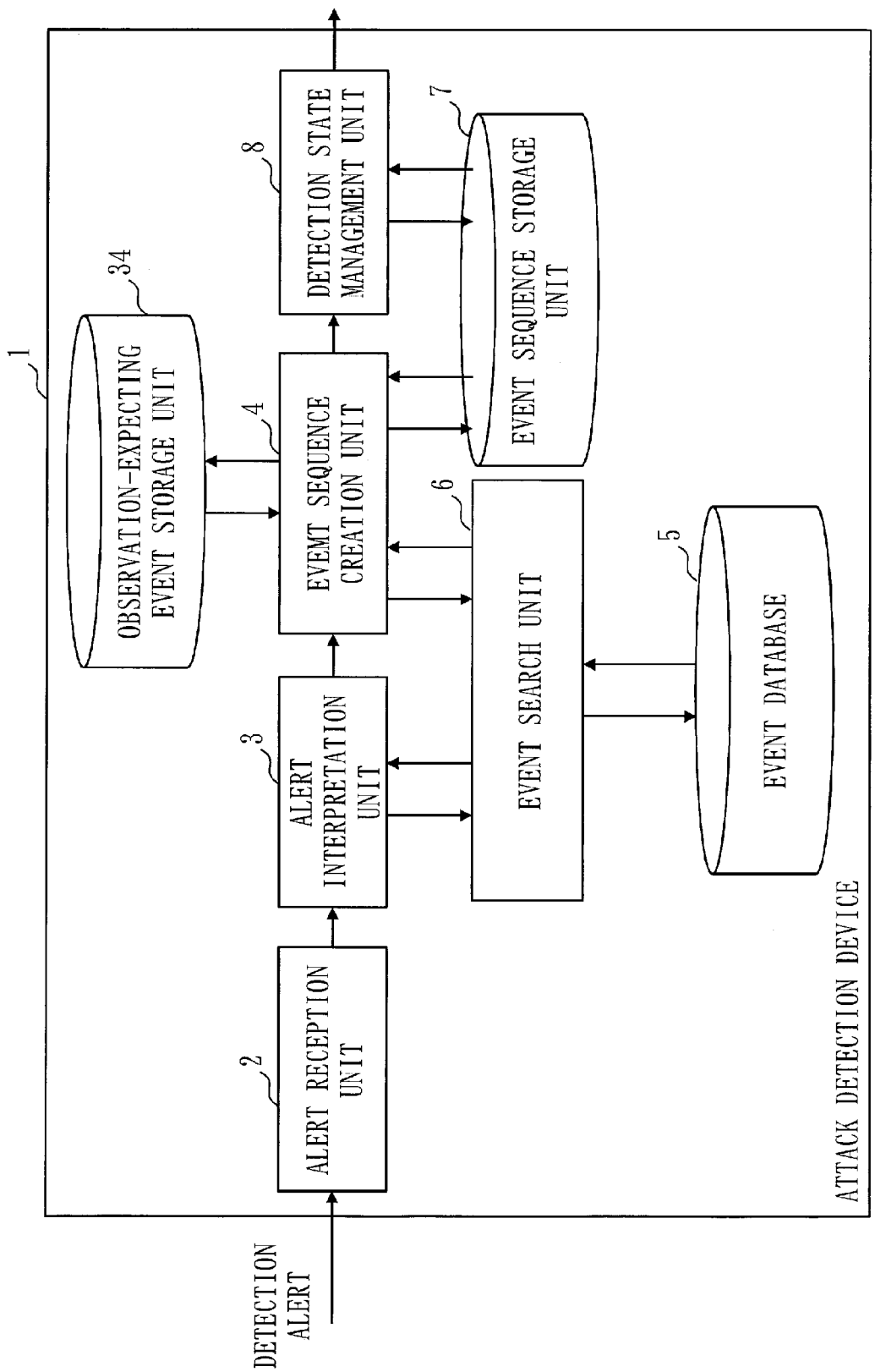
FIG. 22 is a configuration diagram illustrating a configuration example of an attack detection device 1 according to Embodiment 6.

FIG. 22 is a configuration diagram illustrating a configuration example of an attack detection device 1 according to Embodiment 6.

Referring to FIG. 22, the attack detection device 1 is provided with an observation-expecting event storage unit 34 which stores an attack event addable to one of event sequences stored in an event sequence storage unit 7, in addition to the configuration of FIG. 1.

Figure 23:
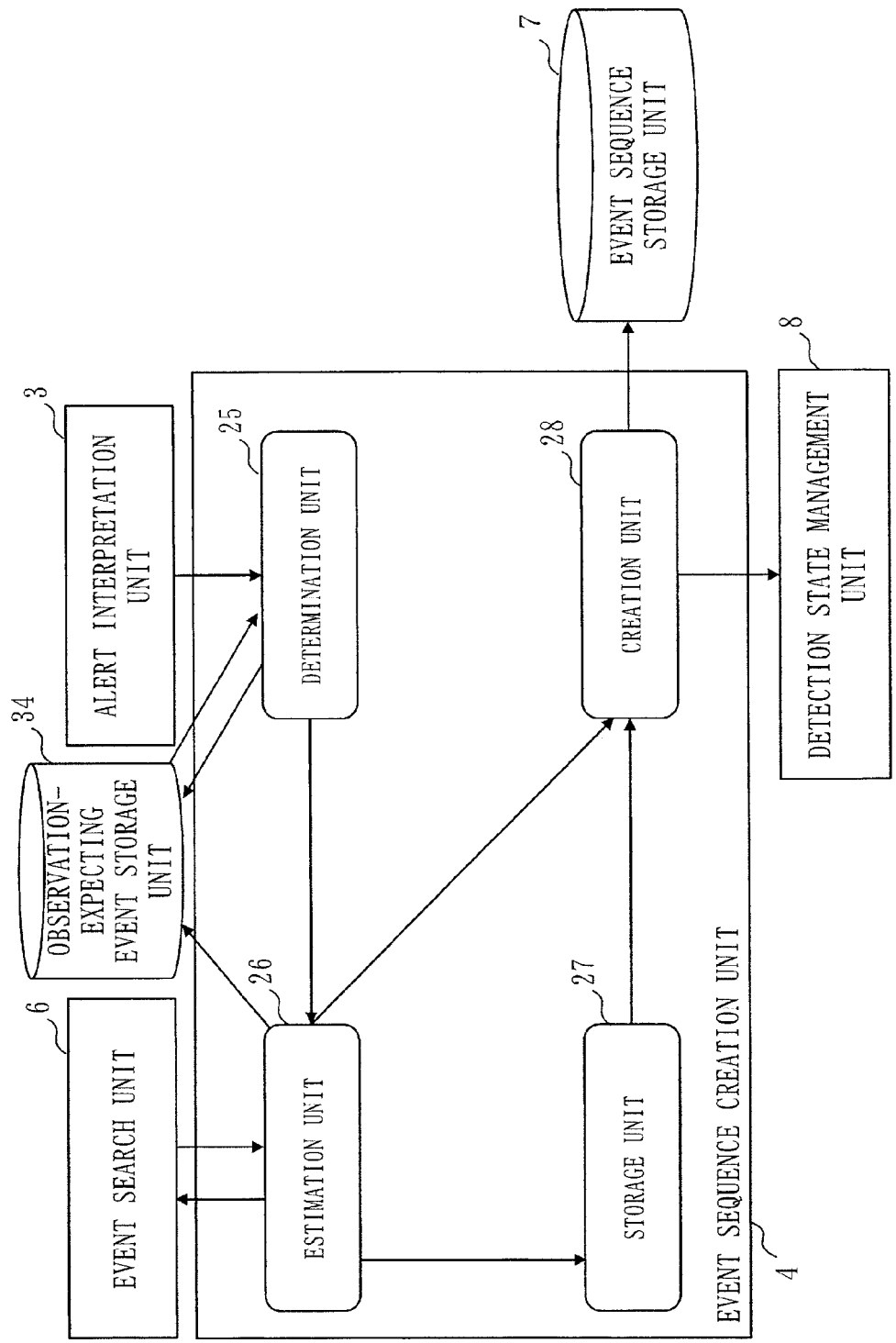
FIG. 23 is a configuration diagram illustrating a configuration example of an event sequence creation unit 4 according to Embodiment 6.

FIG. 23 is a configuration diagram illustrating a configuration example of an event sequence creation unit 4 according to Embodiment 6.

Referring to FIG. 23, an attack event inputted from an alert interpretation unit 3 is inputted to a determination unit 25. The determination unit 25 searches the observation-expecting event storage unit 34 to check whether or not the inputted attack event is included, and determines whether the inputted attack event is an event that is addable to an event sequence.

An estimation unit 26, using an event search unit 6, searches for an attack event having an achieved state of the inputted event as its precondition, from an event database 5, and stores the attack event searched for to the observation-expecting event storage unit 34. If the result of the search by the event search unit 6 indicates that the attack event is an event the system cannot observe, the estimation unit 26 estimates an event the system cannot observe. The scheme for estimation will be described later.

A creation unit 28 adds an attack event in a storage unit 27 and the inputted attack event, to the event sequence obtained by the determination unit 25, to update the event sequence storage unit 7. Alternatively, the creation unit 28 newly registers an event sequence with the event sequence storage unit 7.

The operation of the attack detection device 1 according to Embodiment 6 will be described with reference to FIG. 24.

Figure 24:
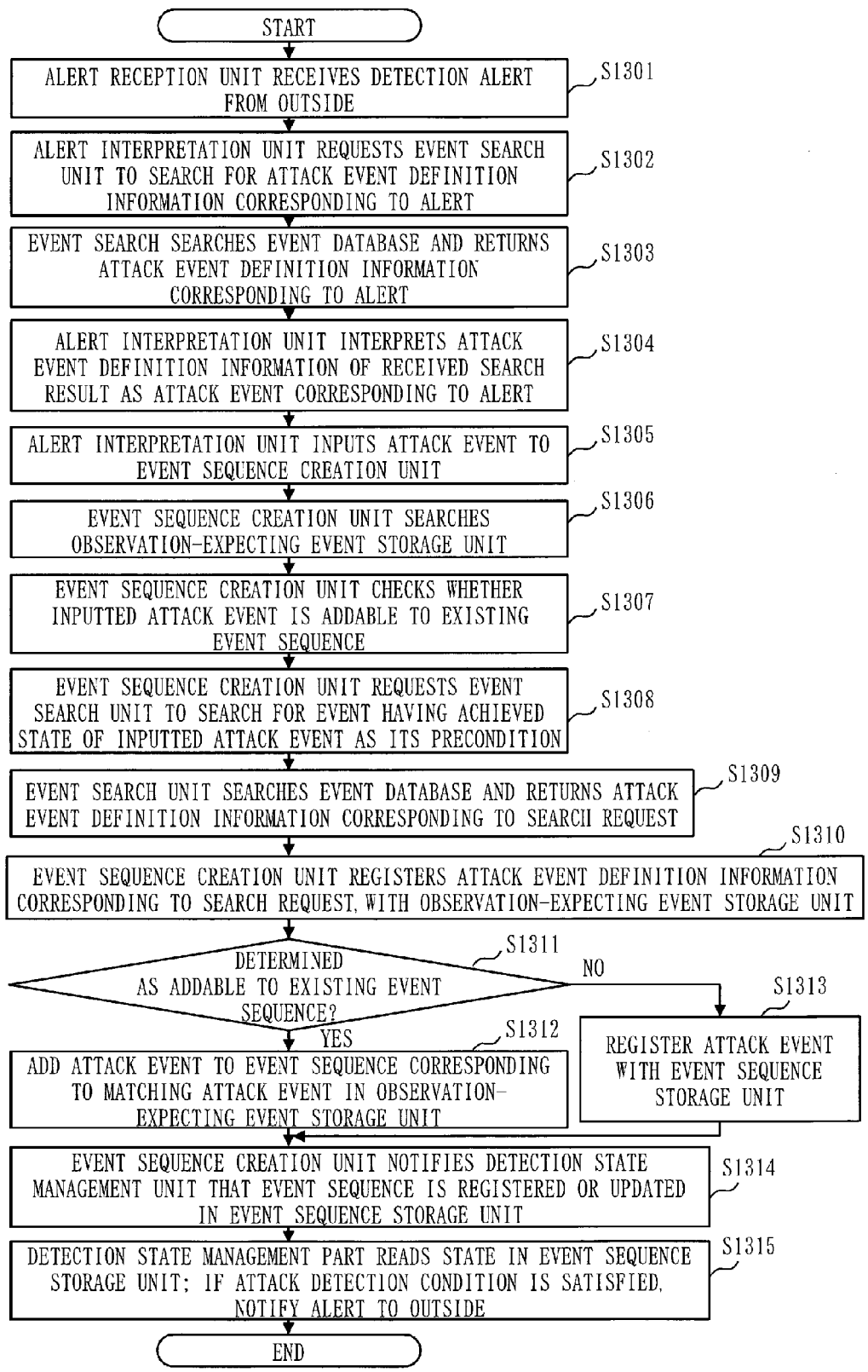
FIG. 24 is a flowchart illustrating a flow of a process of an attack detection device according to Embodiment 6.

FIG. 24 is a flowchart illustrating a flow of a process of the attack detection device according to Embodiment 6.

Referring to FIG. 24, the process of steps S1301 to S1304 concerning an alert reception unit 2, the alert interpretation unit 3, and the event search unit 6 is the same as that in Embodiment 1.

In step S1305, the alert interpretation unit 3 inputs an attack event to the event sequence creation unit 4.

The event sequence creation unit 4 searches the observation-expecting event storage unit 34 in step S1306, and in step S1307 checks from the search result whether the inputted attack event is addable to an existing event sequence. In this checking, if the search result includes the inputted attack event, it is determined that the inputted attack event is addable to the existing event sequence. This determination result is used in later step S1311.

In step S1308, the event sequence creation unit 4 requests the event search unit 6 to search for an event having the achieved state of the inputted attack event as its precondition.

In step S1309, the event search unit 6 searches the event database 5 and returns attack event definition information corresponding to the search request.

In step S1310, the event sequence creation unit 4 registers the attack event definition information corresponding to the search request, with the observation-expecting event storage unit 34.

In step S1311, the event sequence creation unit 4 refers to the determination result of step S1307. If the inputted attack event is determined as addable to the existing event sequence, the event sequence creation unit 4 moves to step S1312 via Yes branch. If the inputted attack event is determined as non-addable, the event sequence creation unit 4 moves to step S1313 via No branch.

When the event sequence creation unit 4 moves to Yes branch in step S1311, then in step S1312, the event sequence creation unit 4 adds the attack event to the event sequence corresponding to a matching attack event in the observation-expecting event storage unit 34, thereby updating the event sequence storage unit 7.

The behaviors of the event sequence storage unit 7 and detection state management unit 8 in steps S1314 and S1315 are the same as those in Embodiment 1.

If the event sequence creation unit 4 moves to No branch in step S1311, then in step S1313, the event sequence creation unit 4 registers the inputted attack event with the event sequence storage unit 7 as a new event sequence. After that, the process of steps S1314 and S1315 is performed.

The operation of the event sequence creation unit 4 of Embodiment will be described in detail.

Figure 25:
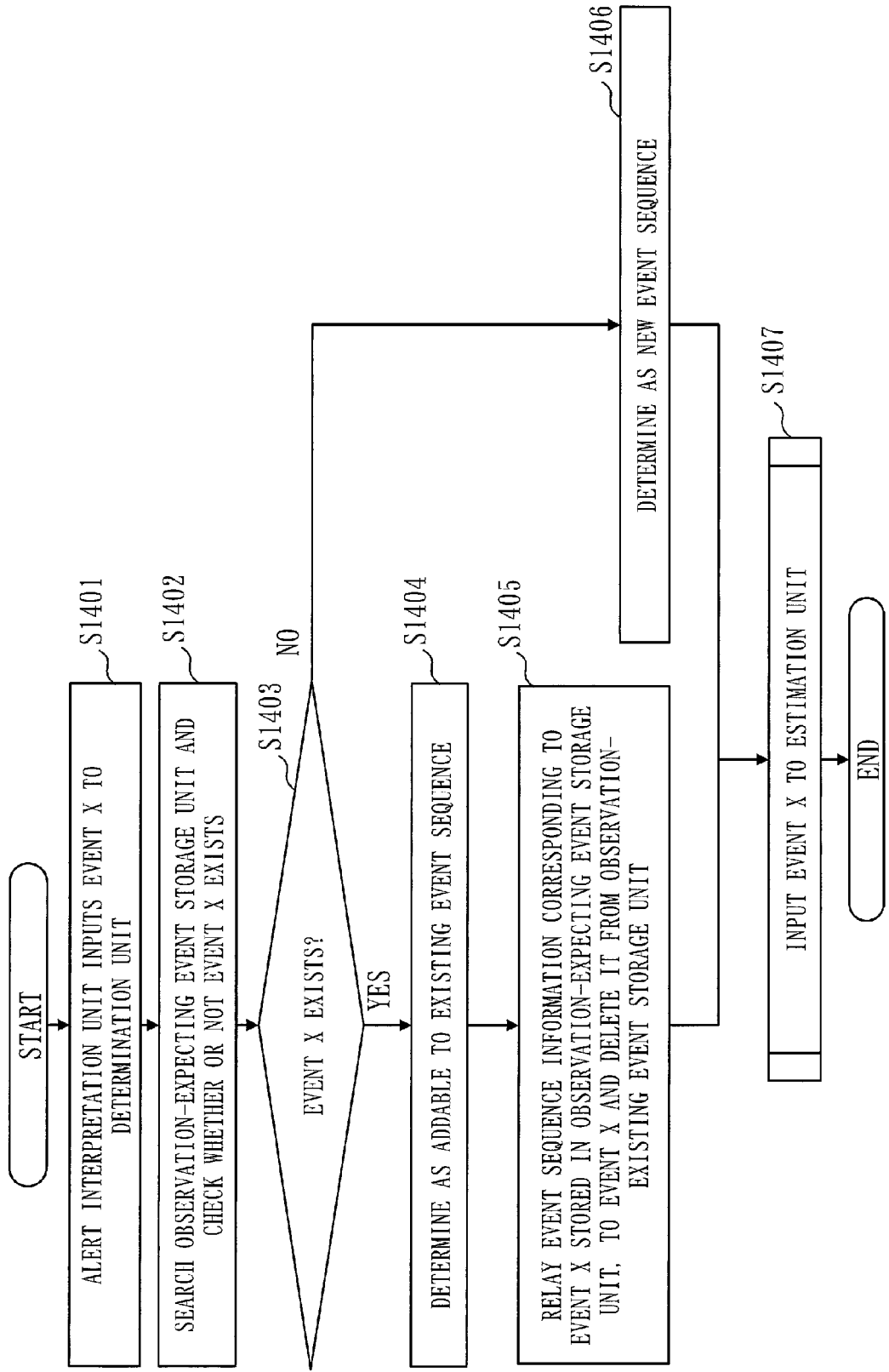
FIG. 25 is a flowchart illustrating a flow of a process of a determination unit 25 according to Embodiment 6.

FIG. 25 is a flowchart illustrating a flow of a process of the determination unit 25 according to Embodiment 6.

First, in step S1401, the alert interpretation unit 3 inputs an event X to the determination unit 25.

Then, in step S1402, the determination unit 25 searches the observation-expecting event storage unit 34 and checks whether or not the event X exists.

In step S1403, the determination unit 25 determines from the search result whether or not the event X exists. If the event X exists, the determination unit 25 moves to step S1404 via Yes branch. If the event X does not exist, the determination unit 25 moves to step S1406 via No branch.

In step S1404, the determination unit 25 determines that the inputted event X is addable to the existing event sequence.

In step S1405, the determination unit 25 relays event sequence information corresponding to the event X stored in the observation-expecting event storage unit 34, to the event X, and deletes the event sequence information from the observation-expecting event storage unit 34.

In step S1407, the determination unit 25 inputs the event X to the estimation unit 26. Then, the processing ends.

If the event X does not exist in step S1403, then in step S1406, the determination unit 25 determines that the event X is a new event sequence. After that, the determination unit 25 inputs the event X to the estimation unit 26 by the process of step S1407. Then, the processing ends.

The operation of a case where the event X is inputted to the estimation unit 26 will be described.

Figure 26:
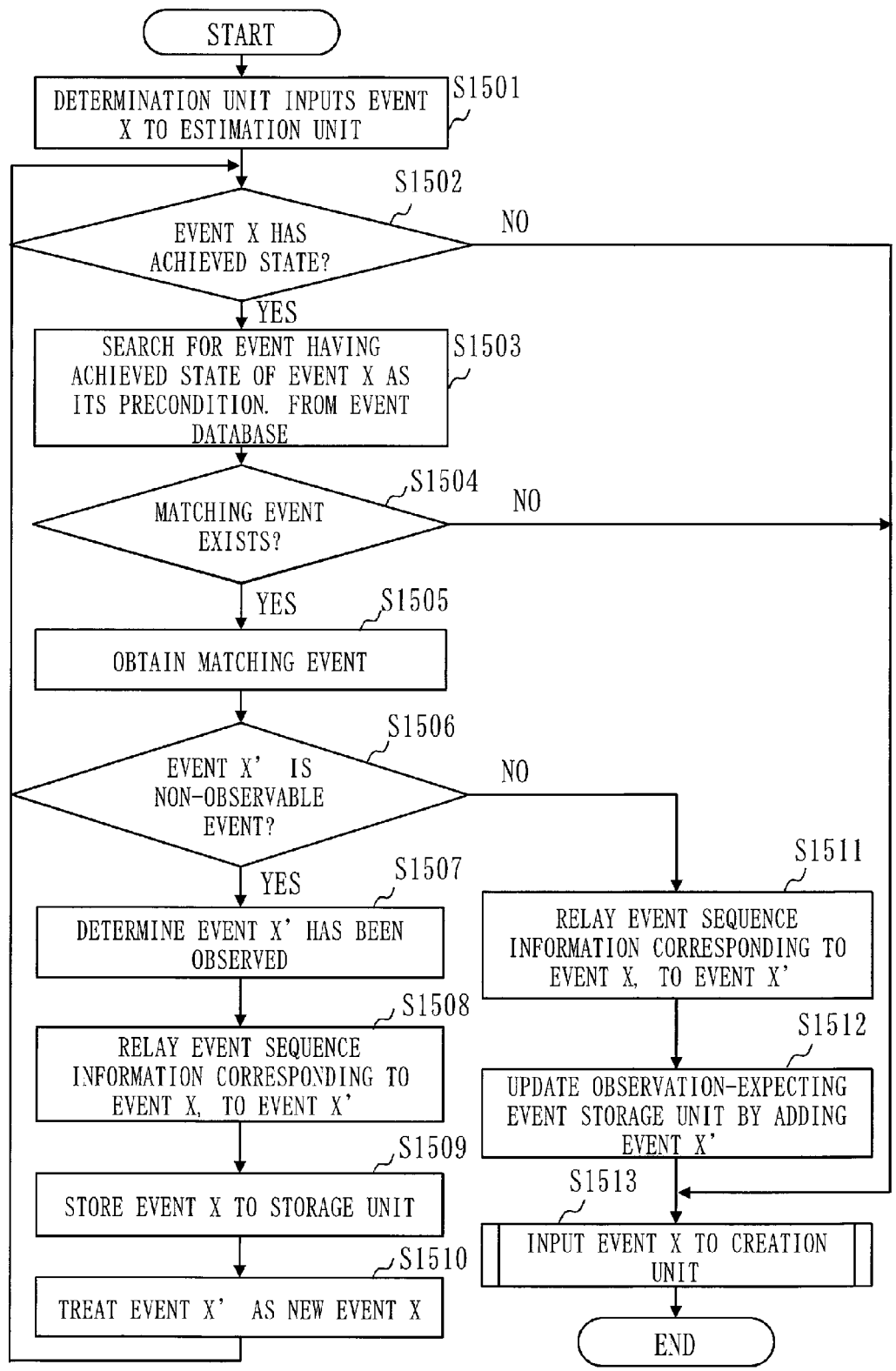
FIG. 26 is a flowchart illustrating a flow of a process of an estimation unit 26 according to Embodiment 6.

FIG. 26 is a flowchart illustrating a flow of a process of the estimation unit 26 according to Embodiment 6.

First, in step S1501, the determination unit 25 inputs the event X to the estimation unit 26.

Then, in step S1502, the estimation unit 26 checks whether or not the event X has an achieved state. If the event X has an achieved state, the estimation unit 26 moves to step S1503 via Yes branch. If the event X does not have an achieved state, the estimation unit 26 moves to step S1513 via No branch.

In step S1503, the estimation unit 26 requests the event search unit 6 to search for an event having the achieved state of the event X as its precondition. Such event is searched for from the event database 5.

In step S1504, the estimation unit 26 checks whether or not an event that matches the search request exists. If an event that matches the search request exists, the estimation unit 26 moves to step S1505 via Yes branch. If an event that matches the search request does not exist, the estimation unit 26 moves to step S1513 via No branch.

In step S1505, the estimation unit 26 obtains an event X' that matches the search request, from the event search unit 6.

In step S1506, the estimation unit 26 checks whether or not the event X' is a non-observable event, from the setting of the observation availability. If the event X' is a non-observable event, the estimation unit 26 moves to step S1507 via Yes branch. If the event X' is an observable event, the estimation unit 26 moves to step S1511 via No branch.

Then, in step S1507, the estimation unit 26 determines that the event X' has already been observed.

In step S1508, the estimation unit 26 relays event sequence information corresponding to the event X, to the event X'. After that, in step S1509, the estimation unit 26 stores the event X to the storage unit 27. In step S1510, the estimation unit 26 treats the event X' as a new event X. Then, the estimation unit 26 returns to step S1502.

If it is determined in step S1506 that the event X' is an event the system can observe, then in step S1511, the estimation unit 26 relays event sequence information corresponding to the event X, to the event X'.

In step S1512, the estimation unit 26 adds the event X' to the observation-expecting event storage unit 34, thereby updating the observation-expecting event storage unit 34. After that, in step S1513, the estimation unit 26 inputs the event X to the creation unit 28. Then, the processing ends.

If the event X does not have an achieved state in step S1502, or as a result of the search, if a matching event does not exist in step S1504, the estimation unit 26 inputs the event X to the creation unit 28 in step S1513. Then, the processing ends.

The operation of a case where the event X is inputted to the creation unit 28 by the process in the estimation unit 26 will be described.

Figure 27:
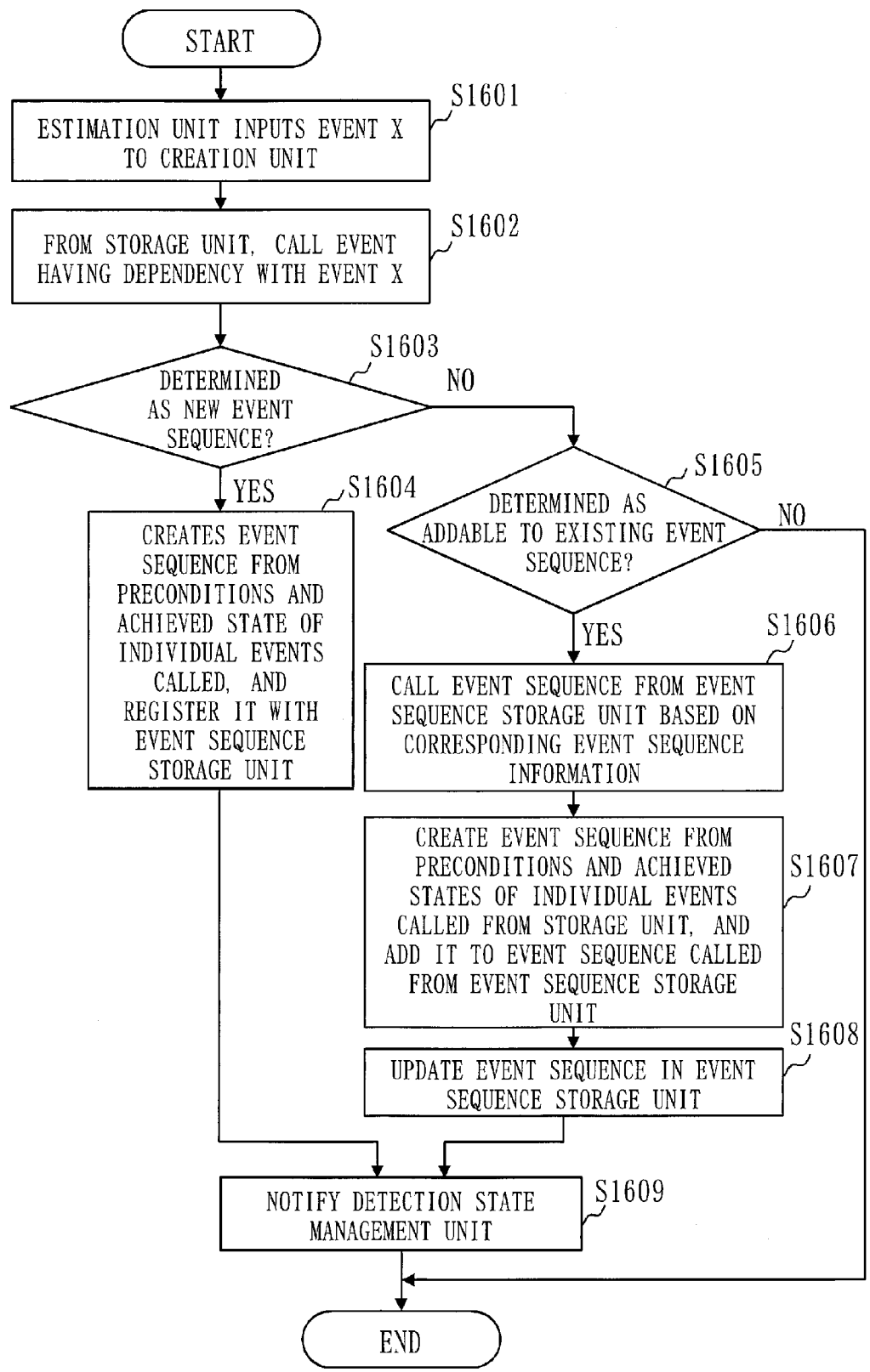
FIG. 27 is a flowchart illustrating a flow of a process of a creation unit 28 according to Embodiment 6.

FIG. 27 is a flowchart illustrating a flow of a process of the creation unit 28 according to Embodiment 6.

First, in step S1601, the estimation unit 26 inputs the event X to the creation unit 28.

Then, in step S1602, the creation unit 28 calls an event having a dependency with the event X, from the storage unit 27. At this time, the dependency is determined in accordance with the relations between the preconditions and achieved states of the events stored in the storage unit 27.

In step S1603, the creation unit 28 checks whether the inputted event X is determined as a new event sequence by the determination unit 25. If the inputted event X is determined as a new event sequence, the creation unit 28 moves to step S1604 via Yes branch. If the inputted event X is not determined as a new event sequence, the creation unit 28 moves to step S1605 via No branch.

In step S1604, the creation unit 28 creates an event sequence from the preconditions and achieved states of the individual events called from the storage unit 27, and registers the created event sequence with the event sequence storage unit 7 as a new event sequence.

In step S1609, the creation unit 28 notifies a detection state management unit 8 that update of the event sequence storage unit 7 has been carries out. Then, the processing ends.

If the inputted event X is not determined as a new event sequence in step S1603, then in step S1605, the creation unit 28 checks whether the inputted event X is determined by the determination unit 25 as addable to an existing event sequence. If the inputted event X is determined as addable, the creation unit 28 moves to step S1606 via Yes branch. If the inputted event X is determined as non-addable, the processing ends via No branch.

In step S1606, the creation unit 28 calls an event sequence from the event sequence storage unit 7 based on event sequence information corresponding to the inputted event X.

In step S1607, the creation unit 28 creates an event sequence from the preconditions and achieved states of individual events called from the storage unit 27, and adds the created event sequence to the event sequence called from the event sequence storage unit 7.

In step S1608, the creation unit 28 updates the pre-addition event sequence in the event sequence storage unit 7, with a post-addition event sequence, and carries out a process of step S1609. Then, the processing ends.

As described above, according to the invention of Embodiment 6, whether a newly observed attack event is addable to an existing event sequence is determined by storing an attack event which is expected to be observed next from the achieved state of the observed attack event. Whether or not being addable to an event sequence can be determined by only checking the stored attack event which is expected to be observed. As compared to Embodiments 1 to 5 where search is required for each event sequence, whether or not being addable can be determined more efficiently.

REFERENCE SIGNS LIST

1: attack detection device; 2: alert reception unit; 3: alert interpretation unit; 4: event sequence creation unit; 5: event database; 6: event search unit; 7: event sequence storage unit; 8: detection state management unit; 9: attack event definition information; 10: precondition; 11: event; 12: achieved state; 13: attack likelihood; 14: observation availability; 15: precondition (specific example); 16: event source; 17: event type; 18: event parameter; 19: event source (specific example); 20: event type (specific example); 21: event parameter (specific example); 22: achieved state (specific example); 23: attack likelihood (specific example); 24: observation availability (specific example); 25: determination unit; 26: estimation unit; 27: storage unit; 28: creation unit; 29: observation-waiting event storage unit; 30: chain probability storage unit; 31: detection pass-through rate storage unit; 32: end determination unit; 33: determination result table; 34: observation-expecting event storage unit

The invention claimed is:

1. An attack detection device comprising:
an event stage information memory which stores, for a plurality of events, event stage information describing an event, a pre-event stage, and a post-event stage, the event being observed by an information system when an attack against the information system is underway, the pre-event stage being a stage of a progress of an attack which is made before the event is observed, the post-event stage being a stage of a progress of an attack which is made after the event is observed;
an observed event notice information receiver which receives observed event notice information notifying an observed event observed by the information system; and
an event sequence creator which searches for event stage information describing the observed event notified by the observed event notice information, from the event stage information memory, searches for event stage information describing a post-event stage coinciding with a pre-event stage of the event stage information searched for or a pre-event stage coinciding with a post-event stage of the event stage information searched for, from the event stage information memory, and if an event of the event stage information searched for is an observation non-available event that cannot be observed, creates an event sequence by treating the observation non-available event as having been observed and connecting the observed event and the observation non-available event to each other with a dependency.

2. The attack detection device according to claim 1, wherein the event sequence creator searches for event stage information describing a post-event stage coinciding with a pre-event stage of the observation non-available event or a pre-event stage coinciding with a post-event stage of the observation non-available event, from the event stage information storage unit, and if an event of the event stage information searched for is observed, creates an event sequence by treating the observation non-available event as having been observed and connecting the observed event and the observation non-available event to each other with a dependency.

3. The attack detection device according to claim 1, further comprising a chain probability memory which stores a chain probability of the plurality of events,
wherein the event sequence creator calculates an occurrence probability of the event sequence based on the chain probability stored in the chain probability memory, and if the occurrence probability is equal to or larger than a threshold value, creates an event sequence by treating the observation non-available event as having been observed and connecting the observed event and the observation non-available event to each other with a dependency.

4. The attack detection device according to claim 1, further comprising a detection pass-through rate memory which stores a detection pass-through rate of an event,
wherein when the detection pass-through rate stored in the detection pass-through rate memory exceeds a threshold value, the event sequence creator creates an event sequence by treating the observation non-available event as having been observed and connecting the observed event and the observation non-available event to each other with a dependency.

5. The attack detection device according to claim 1,
wherein the event stage information stored in the event stage information memory describes a plurality of pre-event stages or a plurality of post-event stages, and
wherein the event sequence creator creates an event sequence based on a determination result on observation availability of the plurality of pre-event stages or post-event stages described in the event stage information.

6. The attack detection device according to claim 1, further comprising an observation-expecting event memory which stores event stage information describing a pre-event stage with which a post-event stage of the observed event coincides,
wherein the event sequence creator creates an event sequence by searching for event stage information in which the pre-event stage describing an observed event, from the observation-expecting event memory.

7. An attack detection method of an attack detection device which detects an attack against an information system, comprising:
an event stage information storage storing step, by an event stage information storage unit, of storing, for a plurality of events, event stage information describing an event, a pre-event stage, and a post-event stage, the event being observed by the information system when an attack against the information system is underway, the pre-event stage being a stage of a progress of an attack which is made before the event is observed, the post-event stage being a stage of a progress of an attack which is made after the event is observed;
a step, by an observed event notice information reception unit, of receiving observed event notice information notifying an observed event observed by the information system; and
an event sequence creation step, by an event sequence creation unit, of searching for event stage information describing the observed event notified by the observed event notice information, from the event stage information storage unit, searching for event stage information describing a post-event stage coinciding with a pre-event stage of the event stage information searched for or a pre-event stage coinciding with a post-event stage of the event stage information searched for, from the event stage information storage unit, and if an event of the event stage information searched for is an observation non-available event that cannot be observed, creating an event sequence by treating the observation non-available event as having been observed and connecting the observed event and the observation non-available event to each other with a dependency.

8. A non-transitory computer readable recording medium which records an attack detection program that causes a computer which stores, for a plurality of events, event stage information describing an event, a pre-event stage, and a post-event stage, the event being observed by an information system when an attack against the information system is underway, the pre-event stage being a stage of a progress of an attack which is made before the event is observed, the post-event stage being a stage of a progress of an attack which is made after the event is observed, to perform:

an observed event notice information reception process of receiving observed event notice information notifying an observed event observed by the information system; and an event sequence creation process of searching for event stage information describing the observed event notified by the observed event notice information, searching for event stage information describing a post-event stage coinciding with a pre-event stage of the event stage information searched for or a pre-event stage coinciding with a post-event stage of the event stage information searched for, and if an event of the event stage information searched for is an observation non-available event that cannot be observed, creating an event sequence by treating the observation non-available event as having been observed and connecting the observed event and the observation non-available event to each other with a dependency.

* * * * *